United States Patent [19]
Winter et al.

[11] Patent Number: 6,057,408
[45] Date of Patent: *May 2, 2000

[54] HIGH MOLECULAR WEIGHT COPOLYMERS OF PROPYLENE AND OLEFINS HAVING 2 OR 4 TO 32 CARBON ATOMS

[75] Inventors: Andreas Winter, Glashütten; Frank Küber, Oberursel; Bernd Bachmann, Eppstein, all of Germany

[73] Assignee: Targor GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/058,828

[22] Filed: Apr. 13, 1998

Related U.S. Application Data

[63] Continuation of application No. 08/759,073, Dec. 2, 1996, abandoned.

[30] Foreign Application Priority Data

Dec. 1, 1995 [DE] Germany .......................... 195 44 828

[51] Int. Cl.[7] .................................................. C08F 4/42
[52] U.S. Cl. .................. 526/160; 526/127; 526/943; 502/117; 502/152; 502/155
[58] Field of Search ..................... 502/117, 152, 502/155; 526/127, 160, 943

[56] References Cited

U.S. PATENT DOCUMENTS

| | | | |
|---|---|---|---|
| 5,561,093 | 10/1996 | Fujita et al. | |
| 5,616,663 | 4/1997 | Imuta et al. | |
| 5,693,836 | 12/1997 | Winter et al. | 556/11 |
| 5,723,640 | 3/1998 | Fukuoka et al. | 556/11 |
| 5,739,366 | 4/1998 | Imuta et al. | 556/11 |
| 5,741,868 | 4/1998 | Winter et al. | 526/127 |
| 5,747,621 | 5/1998 | Resconi et al. | 526/351 |

FOREIGN PATENT DOCUMENTS

| | | |
|---|---|---|
| 2099214 | 12/1993 | Canada . |
| 0 576 970 | 1/1994 | European Pat. Off. . |
| 0 629 632 | 12/1994 | European Pat. Off. . |
| 0 646 604 | 4/1995 | European Pat. Off. . |
| 0 718 324 | 6/1996 | European Pat. Off. . |

OTHER PUBLICATIONS

Kaminsky, "Oleofinpolymerisation mittels metallocenkatylasatoren", Angewandte Makromolekulare Chemie Applied Macromolecular Chemistry and Physics, vol. 223, pp. 101–120, (1994).

Spaleck, "Stereospecific metallocene catalysts", Macromolecular Symposia, vol. 89, pp. 237–247, (Jan. 1995).

*Primary Examiner*—David W. Wu
*Assistant Examiner*—Ling Sui Choi
*Attorney, Agent, or Firm*—Connolly Bove Lodge & Hutz LLP

[57] ABSTRACT

A copolymer having from 80 to 40% by weight of propylene units, based on the total polymer, and from 20 to 60% by weight of at least one comonomer, based on the total polymer. The comonomer units are prepared from ethylene or olefins having at least 4 carbon atoms and the formula $R^a$—CH=CH—$R^b$, where $R^a$ and $R^b$ are identical or different and are each a hydrogen atom or an alkyl radical having from 1 to 15 carbon atoms, or $R^a$ and $R^b$, together with the carbon atoms connecting them, form a ring having 4 to 12 carbon atoms. The copolymer has a viscosity number of greater than 200 cm$^3$/g.

27 Claims, No Drawings

HIGH MOLECULAR WEIGHT COPOLYMERS OF PROPYLENE AND OLEFINS HAVING 2 OR 4 TO 32 CARBON ATOMS

CROSS REFERENCE TO RELATED APPLICATION

This is a continuation of application Ser. No. 08/759,073, filed Dec. 2, 1996, now abandoned.

The present invention relates to a metallocene catalyst system for preparing high molecular weight copolymers, and also relates to high molecular weight copolymers and an economical and environmentally friendly process for their preparation.

In the copolymerization of olefins it is possible to obtain, depending on the process procedure, random copolymers having a low content of comonomers, copolymers having a random or blocked structure and a higher incorporation of comonomers than the random copolymers or copolymer rubber having a comonomer content of significantly above 20% by weight based on the total polymer. The copolymers have different properties and different contents of comonomers. Random copolymers are generally distinguished from the corresponding homopolymers by a lower crystallinity, a lower melting point and a lower hardness. A highly random chain structure is desirable for the random copolymers. The olefin copolymers known in the prior art, which are prepared with the aid of heterogeneous Ziegler catalysts, can only meet this requirement to a very limited extent.

EP-A-263 718 describes random $C_2/C_3/C_n$ terpolymers, where n>3, which are obtained by means of heterogeneous Ziegler catalysts. The $C_3$ content is from 97 to 86 mol %, the $C_2$ content from 0.5 to 6 mol % and the $C_n$ content (n>3) from 2 to 13 mol %. The material has good hot sealing properties but is obtained in a two-stage process using a suspension polymerization step and a gas-phase polymerization step. In order to achieve the desired antiblocking properties, a terpolymer having a high proportion of foreign monomer has to be prepared. However, bipolymers are desirable since these are easier to handle and have a more chemically uniform chain structure.

EP-A-74 194 discloses random $C_2/C_3$ copolymers which are prepared by the suspension process. To obtain the desired property profile, the polymers obtained have to be degraded. A high $C_2$ content is necessary to temper the chemical nonuniformity of a heterogeneous catalyst system. The nonuniformity leads to a higher proportion of low molecular weight, readily soluble, high ethylene content fractions in the polymer and thus to restricted utility in the food packaging sector.

JP-A 62-212 707 discloses an ethylene-propylene copolymer having a high ethylene content and a process for its preparation. The process is carried out using ethylenebisindenylzirconium dichloride at a temperature of less than –10° C. and is thus not suitable for industrial manufacture. In addition, the activity of the catalyst is very low.

EP-A 485 822 discloses the use of metallocenes substituted in the 2 position on the indenyl ligand for preparing copolymers. EP-A-0 629 632 and EP-A-0 576 970 describe the use of metallocene substituted in the 2 and 4 positions on the indenyl ligand. It is common to these very effective systems that they enable a good random comonomer incorporation to be realized, but that they do not enable preparation of a high molecular weight copolymer if a relatively high ethylene content is simultaneously sought. Random copolymers having high ethylene contents are preferred particularly in application areas in which a high molar mass is required. This applies particularly in deep-drawing applications, blow molding and in the case of films for the packaging sector. Sealing films are particular examples. Furthermore, a low proportion of extractable material is particularly necessary in the food packaging sector. In the case of a relatively high comonomer incorporation, this can be achieved only by a copolymer molding composition having a relatively high molecular weight. Relatively high transparencies are likewise demanded, which likewise requires a relatively high comonomer content in the polymer. Good processability of such a polymer likewise necessitates higher molar masses than can be obtained at industrially relevant polymerization temperatures of from 60 to 80° C. using the known metallocenes of the prior art.

The best known metallocenes hitherto, namely representatives of a group having indenyl ligands substituted in the 2 and 4 positions, meet this molar mass target with VN values of about 300 $cm^3/g$ and comonomer contents of below 2% by weight, but these comonomer contents are not sufficient to meet the property profile required of good copolymers. This necessitates higher comonomer contents in which case, for the polymers which are prepared using these metallocenes, the viscosity number (VN) very rapidly drops to values of 200 $cm^3/g$ and is thus too low. Processability, usability and amount of low molecular weight fractions are then in a range which rules out useful application.

The deficiencies are even clearer in the case of copolymers which are described as rubbers. They contain significantly more than 20% by weight, preferably from 30 to 60% by weight, of α-olefin comonomer, possibly up to 10% by weight of a third α-olefin or diene. Up to now, there is no known metallocene by means of which such a polymer molding composition having a VN of above 200 $cm^3/g$ can be produced at industrially realistic process temperatures (>50° C.).

It is an object of the present invention to provide a catalyst component and a catalyst system for preparing high molecular weight copolymers and also provide high molecular weight copolymers and an economical and environmentally friendly process for their preparation.

The object of the present invention is achieved by a catalyst component for preparing a high molecular weight copolymer, which catalyst component is a compound of the formula I

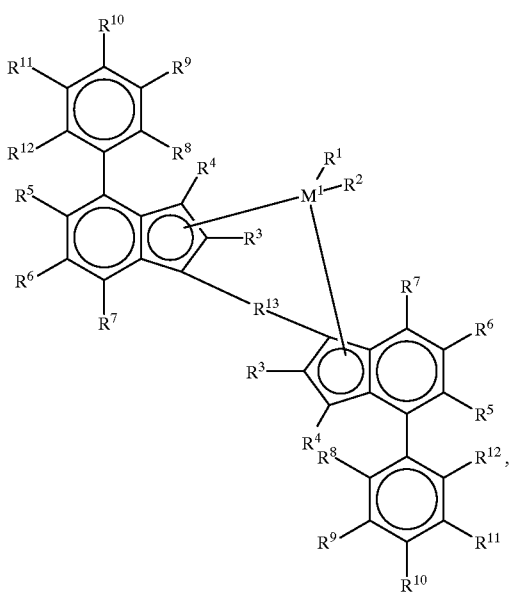

(I)

where $M^1$ is a metal of group IVb, Vb or VIb of the Periodic Table, $R^1$ and $R^2$ are identical or different and are each a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group, an OH group or a halogen atom, the radicals $R^3$ are identical or different and are each a halogen atom, a $C_1$-$C_{20}$-hydrocarbon group such as a $C_1$-$C_{10}$-alkyl group, a $C_1$-$C_{10}$-alkenyl group, a $C_6$-$C_{10}$-aryl group or a $NR^{16}_2$—, —$SR^{16}$, —$OSiR^{16}_3$, —$SiR^{16}_3$ or $PR^{16}_2$ radical, where $R^{16}$ is a halogen atom, a $C_1$-$C_{10}$-alkyl group or a $C_6$-$C_{10}$-aryl group, $R^4$ to $R^{12}$ are identical or different and are as defined for $R^3$ or two or more adjacent radicals $R^4$ to $R^{12}$ together with the atoms connecting them form one or more aromatic or aliphatic rings, or the radicals $R^5$ and $R^8$ or $R^{12}$ together with the atoms connecting them form an aromatic or aliphatic ring, $R^4$ to $R^{12}$ may also be hydrogen and one or more radicals $R^8$, $R^9$, $R^{10}$, $R^{11}$ or $R^{12}$ are different from hydrogen when the radicals $R^5$, $R^6$ and $R^7$ are hydrogen, $R^{13}$ is

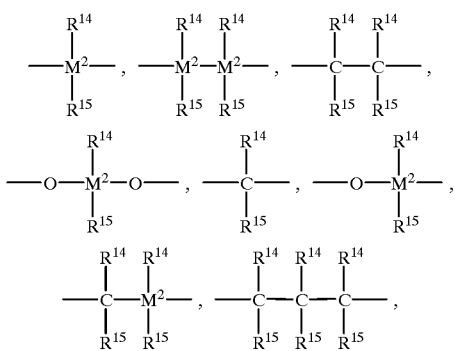

=$BR^{14}$, =$AlR^{14}$, —Ge—, —O—, —S—, =SO, =$SO_2$, =$NR^{14}$, =CO, =$PR^{14}$ or =$P(O)R^{14}$, where $R^{14}$ and $R^{15}$ are identical or different and are each a hydrogen atom, a halogen atom, a $C_1$-$C_{10}$-, in particular $C_1$-$C_4$-alkyl group, a $C_1$-$C_{10}$-fluoroalkyl, in particular $CF_3$ group, a $C_6$-$C_{10}$-, in particular $C_6$-$C_8$-aryl group, a $C_6$-$C_{10}$-fluoroaryl, in particular pentafluorophenyl group, a $C_1$-$C_{10}$-, in particular $C_1$-$C_4$-alkoxy group, in particular a methoxy group, a $C_2$-$C_{10}$-, in particular $C_2$-$C_4$-alkenyl group, a $C_7$-$C_{40}$-, in particular $C_7$-$C_{10}$-arylalkyl group, a $C_8$-$C_{40}$-, in particular $C_8$-$C_{12}$-arylalkenyl group, a $C_7$-$C_{40}$-, in particular $C_7$-$C_{12}$-alkylaryl group or $R^{14}$ and $R^{15}$ together with the atoms connecting them form a ring and $M^2$ is silicon, germanium or tin.

For compounds of the formula I it is preferred that $M^1$ is zirconium or hafnium.

$R^1$ and $R^2$ are preferably identical and are preferably each a $C_1$-$C_4$-alkyl group or a halogen atom, the radicals $R^3$ are preferably each a $C_1$-$C_4$-alkyl group.

$R^4$ to $R^{12}$ are identical or different and are preferably each a hydrogen atom or a $C_1$-$C_4$-alkyl group, a $C_1$-$C_4$-alkenyl group or a $C_6$-$C_{10}$-aryl group, where at least one of the radicals $R^8$, $R^9$, $R^{10}$, $R^{11}$ or $R^{12}$ are different from hydrogen when none of the radicals $R^5$, $R^6$ and $R^7$ are different from hydrogen. Preferably, at least two of the radicals $R^8$, $R^9$, $R^{10}$, $R^{11}$ or $R^{12}$ are different from hydrogen when the radicals $R^5$, $R^6$ and $R^7$ are hydrogen. Particularly preferably, two or more adjacent radicals $R^8$, $R^9$, $R^{10}$, $R^{11}$ or $R^{12}$ form one or more aromatic or aliphatic rings.

The radicals $R^3$ are identical or different and are each a $C_1$-$C_{10}$-alkyl group which may be halogenated, a $C_1$-$C_{10}$-alkenyl group which may be halogenated, a $C_6$-$C_{10}$-aryl group which may be halogenated.

The radicals $R^{13}$ are preferably

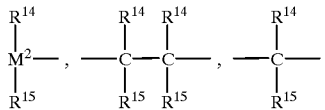

where $M^2$ is silicon or germanium and $R^{14}$ and $R^{15}$ are identical or different and are each a $C_1$-$C_4$-alkyl group or a $C_6$-$C_{10}$-aryl group.

$R^{14}$ and $R^{15}$ are identical or different and are preferably each a $C_1$-$C_4$-alkyl group, in particular a methyl group, a $CF_3$ group, a $C_6$-$C_8$-aryl group, a pentafluorophenyl group, a $C_1$-$C_{10}$-, in particular $C_1$-$C_4$-alkoxy group, in particular a methoxy group, a $C_2$-$C_4$-alkenyl group, a $C_7$-$C_{10}$-arylalkyl group, a $C_8$-$C_{12}$-arylalkenyl group, a $C_7$-$C_{12}$-alkylaryl group.

Furthermore, preference is given to compounds of the formula I in which the radicals $R^4$ and $R^7$ are hydrogen and $R^5$ and $R^6$ are each a $C_1$-$C_4$-alkyl group or hydrogen.

Particular preference is given to compounds of the formula I in which $M^1$ is zirconium, $R^1$ and $R^2$ are identical and are each chlorine or a methyl group, the radicals $R^3$ are identical and are each a methyl or ethyl group, $R^4$ and $R^7$ are hydrogen, $R^5$ and $R^6$ are identical or different and are each a $C_1$-$C_4$-alkyl group or hydrogen, at least two of the radicals $R^8$, $R^9$, $R^{10}$, $R^{11}$ or $R^{12}$ are different from hydrogen and form at least one aromatic ring which is preferably 6-membered, and/or $R^5$ or $R^6$ are each a $C_1$-$C_4$-alkyl group when the radicals $R^8$, $R^9$, $R^{10}$, $R^{11}$ or $R^{12}$ are hydrogen, and $R^{13}$ is where 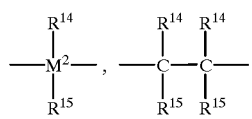
$M^2$ is silicon and $R^{14}$ and $R^{15}$ are identical or different and are each a $C_1$–$C_4$-alkyl group or a $C_6$–$C_{10}$-aryl group.
The compounds or types of compounds specified in the Examples are very particularly suitable.
The preparation of the metallocenes I is carried out by literature methods and is shown in the following reaction scheme.
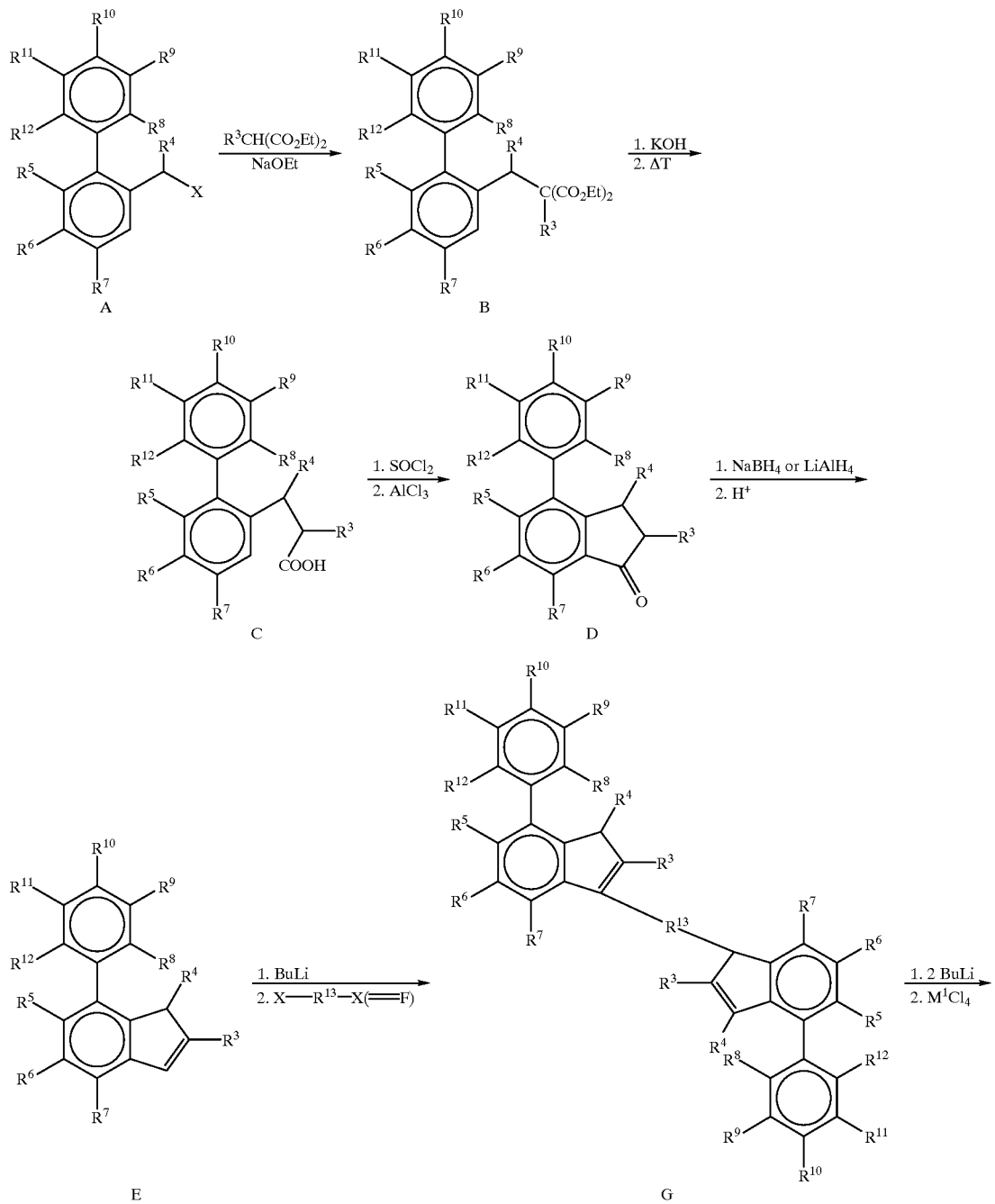

-continued

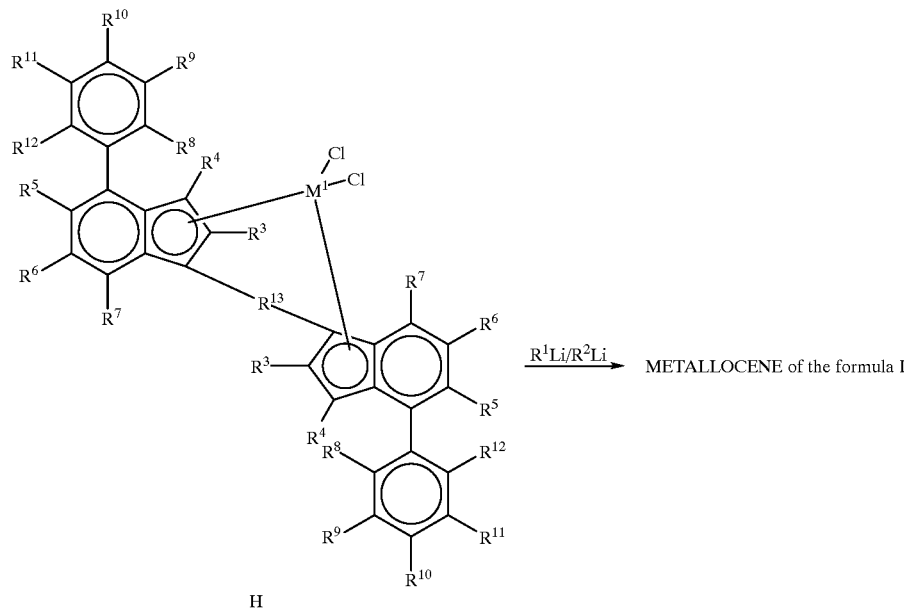

H

The 2-phenylbenzyl halide derivatives of the formula A are commercially available or can be prepared by literature methods.

The conversion into the compounds of the formula B is carried out by reaction with substituted malonic esters under basic conditions, for example in ethanolic solutions of sodium methoxide.

The compounds of the formula B are saponified with alkali metal hydroxides such as potassium hydroxide or sodium hydroxide and decarboxylated by treating the resulting dicarboxylic acids by heating to give the compounds of the formula C.

The ring closure to give the corresponding phenyl-1-indanones of the formula D is carried out by reaction with chlorination reagents such as $SOCl_2$ to give the corresponding acid chlorides and subsequent cyclization using a Friedel-Crafts catalyst in an inert solvent, for example $AlCl_3$ or polyphosphoric acid in methylene chloride or $CS_2$.

The conversion into the 7-phenylindene derivatives of the formula E is carried out by reduction with a hydride-transferring reagent such as sodium borohydride or lithium aluminum hydride or hydrogen and an appropriate catalyst in an inert solvent such as diethyl ether or tetrahydrofuran to give the corresponding alcohols and dehydration of the alcohols under acid conditions, for example using p-toluenesulfonic acid or an aqueous mineral acid, or by reaction with water-withdrawing substances such as magnesium sulfate, anhydrous copper sulfate or molecular sieves.

The preparation of the ligand systems of the formula G and the conversion into the bridged chiral metallocenes of the formula H as well as the isolation of the desired racemic form are known in principle. For this purpose, the phenylindene derivative of the formula E is deprotonated with a strong base such as butyllithium or potassium hydride in an inert solvent and reacted with a reagent of the formula F to form the ligand system of the formula G. This is subsequently deprotonated with two equivalents of a strong base such as butyllithium or potassium hydride in an inert solvent and reacted with the corresponding metal tetrahalide such as zirconium tetrachloride in a suitable solvent. Suitable solvents are aliphatic or aromatic solvents such as hexane or toluene, ether solvents such as tetrahydrofuran or diethyl ether or halogenated hydrocarbons such as methylene chloride or halogenated aromatic hydrocarbons such as o-dichlorobenzene. The separation of the racemic and meso forms is carried out by extraction or recrystallization using suitable solvents.

The derivatization to give the metallocenes of the formula I can be carried out by reaction with alkylating agents such as methyllithium.

The metallocenes I of the invention are highly active catalyst components for olefin copolymerization. The chiral metallocenes are preferably used as the racemate. However, it is also possible to use the pure enantiomer in the (+) or (−) form. The pure enantiomers enable an optically active polymer to be prepared. However, the meso form of the metallocenes should be separated off, since the polymerization-active center (the metal atom) in these compounds is no longer chiral owing to the mirror symmetry at the central metal atom and can therefore not produce a highly isotactic polymer. If the meso form is not separated off, atactic polymer is formed in addition to isotactic polymers. For certain applications, for example soft moldings, this can be thoroughly desirable.

The invention provides a catalyst system comprising a metallocene and a compound which can convert the metallocene into a polymerization-active species. This compound is a cocatalyst.

The catalyst system can also contain a support. The catalyst system can also be prepolymerized. Preference is given to such a supported and prepolymerized embodiment in polymerization processes in which a polymer powder having a high bulk density, uniform particle shape and good handleability in the plant is necessary.

According to the invention, the cocatalyst used is preferably an aluminoxane which preferably has the formula IIa for the linear type and/or the formula IIb for the cyclic type,

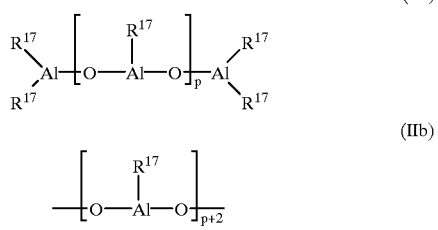

where, in the formulae IIa and IIb, the radicals $R^{17}$ can be identical or different and are each a $C_1$–$C_6$-alkyl group, a $C_6$–$C_{18}$-aryl group, benzyl or hydrogen and p is an integer from 2 to 50, preferably from 10 to 35.

The radicals $R^{17}$ are preferably identical and are methyl, isobutyl, phenyl or benzyl, particularly preferably methyl.

If the radicals $R^{17}$ are different, they are preferably methyl and hydrogen or alternatively methyl and isobutyl, with hydrogen or isobutyl preferably being present in an amount of up to 0.01 to 40% (number of radicals $R^{17}$).

The aluminoxane can be prepared in various ways by known methods. One of the methods is, for example, reacting an aluminum hydrocarbon compound and/or a hydridoaluminum hydrocarbon compound with water (gaseous, solid, liquid or bound—for example as water of crystallization) in an inert solvent (for example toluene). To prepare an aluminoxane having different radicals $R^{17}$, for example two different trialkylaluminums corresponding to the desired composition are reacted with water.

The precise three-dimensional structure of the aluminoxanes IIa and IIb is not known.

Regardless of the method of preparation, all aluminoxane solutions have in common a varying content of unreacted aluminum starting compound which is present in free form or as adduct.

It is possible to preactivate the metallocene by means of an aluminoxane, in particular one of the formula IIa and/or IIb, prior to use in the polymerization reaction. This significantly increases the polymerization activity and improves the particle morphology. The preactivation of the transition metal compound is carried out in solution. For the preactivation, the metallocene is preferably dissolved in a solution of the aluminoxane in an inert hydrocarbon. Suitable inert hydrocarbons are aliphatic or aromatic hydrocarbons. Preference is given to using toluene.

The concentration of the aluminoxane in the solution is in the range from about 1% by weight to the saturation limit, preferably from 5 to 30% by weight, in each case based on the total amount of solution. The metallocene can be used in the same concentration, but it is preferably used in an amount of $10^{-4}$–1 mol per mol of aluminoxane. The preactivation takes from a few seconds to 60 hours, preferably from 1 to 60 minutes. It is carried out at a temperature of from −78 to 100° C., preferably from 0 to 70° C.

A prepolymerization can be carried out with the aid of the metallocene. For the prepolymerization, preference is given to using at least one of the olefins used in the polymerization.

The metallocene can also be applied to a support. Suitable support materials are, for example, silica gels, aluminum oxides, solid aluminoxane or other inorganic support materials such as magnesium chloride. Another suitable support material is a polymer powder, in particular polyolefin powder in finely divided form.

The cocatalyst, e.g. the aluminoxane, is preferably applied to a support such as silica gel, aluminum oxide, solid aluminoxane, another inorganic support material or else a polyolefin powder in finely divided form and then reacted with the metallocene. Alternatively, the metallocene and the cocatalyst are dissolved in a suitable solvent and then applied to the support. The solvent can then be removed again.

As inorganic supports, it is possible to use oxides which have been produced flame-pyrolytically by combustion of element halides in a hydrogen/oxygen flame, or can be prepared as silica gels having certain particle size distributions and particle shapes.

The preparation of the supported cocatalyst can be carried out, for example, as described in EP 92 107 331.8 in the following manner in a stainless steel reactor having an explosion-proof design and fitted with a pump circulation system having a pressure rating of 60 bar, with inert gas supply, temperature control by jacket cooling and a second cooling circuit via a heat exchanger on the pump circulation system. The pump circulation system draws in the reactor contents via a connection in the bottom of the reactor by means of a pump and pushes it into a mixer and through a riser line via a heat exchanger back into the reactor. The mixer is configured such that in the inlet section there is a constricted tube cross-section in which the flow velocity increases and into the turbulence zone of which there is conducted, counter to the flow direction, a thin feed line through which, pulsed, a defined amount of water under 40 bar of argon can be fed in in each case. The reaction is monitored by means of a sampler on the pump circuit.

In principle, however, other reactions and industrial embodiments are also suitable.

The above-described reactor having a volume of 16 $dm^3$ is charged with 5 $dm^3$ of decane under inert conditions. 0.5 $dm^3$ (=5.2 mol) of trimethylaluminum are added at 25° C. 350 g of silica gel Grace/Davison 948 which have been dried beforehand at 600° C. in an argon fluidized bed are then metered into the reactor through a solids funnel and are homogeneously distributed by means of the stirrer and the pump circulation system. A total amount of 76.5 g of water is introduced into the reactor in portions of 0.1 $cm^3$ every 15 seconds over a period of 3.25 hours. The pressure resulting from the argon and the gases evolved is kept constant at 10 bar by means of a pressure regulating valve. After all the water has been introduced, the pump circulation system is switched off and stirring is continued for 5 hours at 25° C.

The supported cocatalyst "FMAO on $SiO_2$" prepared in this way is used as a 10% strength suspension in n-decane. The aluminum content is 1.06 mmol of Al per $cm^3$ of suspension. The isolated solid contains 20% by weight of aluminum, the suspension medium containing 0.1% by weight of aluminum.

Further possible ways of preparing a supported cocatalyst are described, for example, in EP 92 107 331.8.

Subsequently, the metallocene of the invention is applied to the supported cocatalyst by stirring the dissolved metallocene with the supported cocatalyst. The solvent is removed and replaced by a hydrocarbon in which both cocatalyst and the metallocene are insoluble.

The reaction to form the supported catalyst system is carried out at a temperature of from −20° C. to +120° C., preferably 0–100° C., particularly preferably from 15 to 40° C. The metallocene is reacted with the supported cocatalyst by combining a suspension of from 1 to 40% by weight, preferably from 5 to 20% by weight, of the cocatalyst in an aliphatic, inert suspension medium such as n-decane, hexane, heptane or diesel oil with a solution of the metallocene in an inert solvent such as toluene, hexane, heptane or dichloromethane or with the finely milled solid of the metallocene. The other way around, a solution of the metallocene can also be reacted with the solid of the cocatalyst.

The reaction is carried out by intensive mixing, for example by stirring together at a molar Al/M$^1$ ratio of from 100/1 to 10000/1, preferably from 100/1 to 3000/1, for a reaction time of from 5 to 600 minutes, preferably from 10 to 120 minutes, particularly preferably from 10 to 60 minutes, under inert conditions.

During the course of the reaction time for preparing the supported catalyst system, particularly when using metallocenes of the invention having absorption maxima in the visible region, changes occur in the color of the reaction mixture and these color changes enable the progress of the reaction to be monitored.

After the reaction time has elapsed, the supernatant solution is separated off, for example by filtration or decantation. The remaining solid can be washed from 1 to 5 tines with an inert suspension medium such as toluene, n-decane, hexane, diesel oil or dichloromethane for removing the soluble constituents in the catalyst formed, in particular for removing unreacted and therefore soluble metallocene.

The supported catalyst system thus prepared can be resuspended as vacuum-dried powder or while still moist with solvent and metered as a suspension in an inert suspension medium into the polymerization system. Inert suspension media are the abovementioned suspension media or wax-like hydrocarbons.

According to the invention, other suitable cocatalysts which can be used in place of or in addition to an aluminoxane are compounds of the formulae $R^{18}_x NH_{4-x} BR^{19}_4$, $R^{18}_x PH_{4-x} BR^{19}_4$, $R^{18}_3 CBR^{19}_4$, $BR^{19}_3$. In these formulae, x is a number from 1 to 4, preferably 3, the radicals $R^{18}$ are identical or different, preferably identical, and are $C_1$–$C_{10}$-alkyl, $C_6$–$C_{18}$-aryl or 2 radicals $R^{18}$ together with the atoms connecting them form a ring and the radicals $R^{19}$ are identical or different, preferably identical, and are $C_6$–$C_{18}$-aryl which can be substituted by alkyl, haloalkyl or fluorine.

In particular, $R^{18}$ is ethyl, propyl or phenyl and $R^{19}$ is phenyl, pentafluorophenyl, 3,5-bistrifluoromethylphenyl, mesityl, xylyl or tolyl (cf. EP-A 277 003, EP-A 277 004 and EP-A 426 638).

When using the abovementioned cocatalysts, the actual (active) polymerization catalyst is the reaction product of the metallocene and at least one of the cocatalysts. For this reason, this reaction product is preferably first prepared outside the polymerization reactor in a separate step using a suitable solvent.

According to the invention, a suitable cocatalyst is in principle any compound which, owing to its Lewis acidity, can convert the neutral metallocene into a cation and stabilize the latter ("labile coordination"). In addition, the cocatalyst or the anion formed therefrom should undergo no further reactions with the metallocene cation formed (cf. EP-A 427 697).

To remove catalyst poisons present in the olefin monomer, purification using an aluminum alkyl, for example trimethylaluminum, triisobutylaluminum or triethylaluminum, is advantageous. This purification can be carried out either in the polymerization system itself or the olefin is brought into contact with the Al compound and subsequently separated off again before addition to the polymerization system.

The invention provides a copolymer having a viscosity number (VN)>200 cm$^3$/g, preferably >250 cm$^3$/g and particularly preferably >300 cm$^3$/g. The copolymer of the invention comprising from 99.5 to 30% by weight, based on the total polymer, of propylene units, preferably from 98.5 to 40% by weight, particularly preferably from 97.5 to 50% by weight, of propylene units. Correspondingly, the contents of comonomer units are from 0.5 to 70% by weight, preferably from 1.5 to 60% by weight and particularly preferably from 2.5 to 50% by weight. The comonomer units are derived from ethylene or olefins having at least 4 carbon atoms and the formula $R^a$—CH=CH—$R^b$, where $R^a$ and $R^b$ are identical or different and are each a hydrogen atom or a hydrocarbon radical having from 1 to 15 carbon atoms, for example a $C_1$–$C_{15}$-alkyl radical, or $R^a$ and $R^b$ together with the carbon atoms connecting them form a ring having from 4 to 12 carbon atoms. Examples of such comonomers are 1-olefins such as ethylene, 1-butene, 1-pentene, 1-hexene, 4-methyl-1-pentene or ethylidenenorbornene.

Very particularly preferably, random copolymers are composed of from 1.5 to 15% by weight of comonomer and from 98.5 to 85% by weight of propylene, while rubbers have comonomer contents of from 20 to 60% by weight and propylene contents of from 80 to 40% by weight. Terpolymers can additionally contain up to 10% by weight, preferably up to 5% by weight, of the diene component.

Such rubbers or terpolymers have viscosity numbers (VN) of >200 cm$^3$ preferably >250 cm$^3$ and particularly preferably >300 cm$^3$/g. Random copolymers having $C_2$ contents of >4% by weight have VN values of >250 cm$^3$/g and preferably >300 cm$^3$/g. Random copolymers having $C_2$ contents of from 1.5 to 40% by weight have VN values of >350 cm$^3$/g.

The invention also provides a process for preparing a copolymer. For this purpose, polymerization can be carried out at a temperature of from 50 to 200° C., preferably from 55 to 150° C., particularly preferably from 60 to 150° C., at a pressure of from 0.5 to 100 bar, preferably from 2 to 80 bar, particularly preferably from 20 to 64 bar, in solution, in suspension or in the gas phase, in one or more stages, in the presence of the catalyst system of the invention.

The copolymerization can be carried out in solution, in suspension or in the gas phase, continuously or batchwise, in one or more stages at a temperature of from 50 to 200° C., preferably from 5 to 150° C., particualrly preferably from 60 to 150° C. Monomers which are copolymerized are propylene and olefins derived from ethylene or olefins having at least 4 carbon atoms and the formula $R^a$—CH=CH—$R^b$, where $R^a$ and $R^b$ are identical or different and are each a hydrogen atom or a hydrocarbon radical having from 1 to 15 carbon atoms, for example an alkyl radical, or $R^a$ and $R^b$ together with the carbon atoms connecting them form a ring having from 4 to 12 carbon atoms. Other olefins which can be used are dienes, in which case $R^a$ or $R^b$ is a $C_2$–$C_{12}$-alkene and $R^a$ and $R^b$ can here too also be joined to form a ring. Examples of such dienes are the ethylidenenorbornene, norbornadiene, dicyclopentadiene, 1,4-hexadiene or butadiene. Preference is given to using such dienes for copolymerization with propylene and a further olefin.

Examples of olefins as comonomers are 1-olefins such as ethylene, 1-butene, 1-pentene, 1-hexene, 4-methyl-1-pentene, 1-octene, norbornene. Preference is given to polymerizing propylene and ethylene, in the case of the preparation of a terpolymer preference is given to polymerizing propylene, ethylene and ethylidenenorbornene.

As molecular weight regulator and/or to increase the activity, hydrogen can be added if required. The total pressure in the polymerization system is from 0.5 to 100 bar. Preference is given to carrying out the polymerization in the industrially particularly interesting pressure range of from 5 to 64 bar. Here, the metallocene is employed in a concentration, based on the transition metal, of from $10^{-3}$ to $10^{-8}$ mol, preferably from $10^{-4}$ to $10^{-7}$ mol, of transition metal per $dm^3$ of reactor volume. The aluminoxane is used in a concentration of from $10^{-5}$ to $10^{-1}$ mol, preferably from $10^{-4}$ to $10^{-2}$ mol, per $dm^3$ of solvent or per $dm^3$ of reactor volume. The other cocatalysts mentioned are used in approximately equimolar amounts to the metallocene. However, higher concentrations are also possible in principle.

When the polymerization is carried out as a suspension or solution polymerization, an inert solvent customary for the Ziegler low-pressure process is used. For example, the polymerization is carried out in an aliphatic or cycloaliphatic hydrocarbon, for example propane, butane, hexane, heptane, isooctane, cyclohexane, methylcyclohexane. It is also possible to use a petroleum or hydrogenated diesel oil fraction. Toluene can also be used. Preference is given to carrying out the polymerization in the liquid monomer.

If inert solvents are used, the monomers are metered in in gaseous or liquid form.

The polymerization time can be any desired, since the catalyst system to be used according to the invention displays only a low time-dependent drop in the polymerization activity.

Before adding the catalyst, in particular the supported catalyst system (comprising the metallocene of the invention and a supported cocatalyst or comprising a metallocene of the invention and an organoaluminum compound on a polymer powder in finely divided form), it is possible to additionally introduce another aluminum alkyl compound such as trimethylaluminum, triethylaluminum, triisobutylaluminum, trioctylaluminum or isoprenylaluminum into the reactor to make the polymerization system inert (for example to remove catalyst poisons present in the olefin). This is added to the polymerization system in a concentration of from 100 to 0.01 mmol of Al per kg of reactor contents. Preference is given to triisobutylaluminum and triethylaluminum in a concentration of from 10 to 0.1 mmol of Al per kg of reactor content. This enables a small $Al/M^1$ molar ratio to be selected in the synthesis of a supported catalyst system.

However, the use of further substances for catalyzing the copolymerization reaction is in principle not required, i.e. the systems of the invention can be used as sole catalyst for olefin copolymerization, in particular no stereo regulators (donors) are necessary.

The process of the invention enables high molecular weight propylene copolymers to be prepared in the industrially particularly interesting temperature range from 65 to 150° C. In particular, it makes it possible to obtain high molecular weight random copolymers having a high comonomer content and a high transparency and low proportion of extractable material, and also rubbers which under industrially sensible polymerization temperatures of >50° C. have a very high molar mass and viscosity numbers of >200 $cm^3/g$.

The invention provides for the use of at least one catalyst component of the invention or at least one catalyst system of the invention for preparing high molecular weight copolymers.

The invention provides for the use of the copolymers of the invention for preparing highly transparent, stiff moldings, in particular by thin-wall injection molding, highly transparent stiff films, high molecular weight rubber having a low glass transition temperature, block copolymers having a high molecular weight and high impact toughness, and high molecular weight random copolymers having low proportions of extractable material for use in the food packaging sector.

The invention is illustrated by the following examples.

All glass apparatus was baked out in vacuo and flushed with argon. All operations were carried out with exclusion of moisture and oxygen in Schlenk vessels. The solvents used were in each case freshly distilled from Na/K alloy under argon and stored in Schlenk vessels.

Abbreviations:
VN=viscosity number in $cm^3/g$
$M_w$=weight average molar mass in g/mol (determined by gel permeation chromatography)
$M_w/M_n$=molar mass dispersity
$M_p$.=melting point in ° C (determined by means of DSC, 20° C./min heating/cooling rate)
MFI 230/2.16
MFI 230/5=melt flow index measured in accordance with DIN 53 735.

I. Synthesis of the metallocenes I used in the polymerization examples (the starting materials used are commercially available) or the metallocene (5) not according to the invention (Example A) used for the comparative experiments:

EXAMPLE A rac-Dimethylsilylbis(2-methyl-4-phenylindenyl)zirconium dichloride (5)

1. (±)-2-(2-Phenylbenzyl)propionic acid (1).

48.6 g (0.279 mol) of diethyl methylmalonate were added dropwise at room temperature to 6.5 g (0.285 mol) of sodium in 160 $cm^3$ of $H_2O$-free EtOH. 70.4 g (0.285 mol) of 2-phenylbenzyl bromide in 20 $cm^3$ of $H_2O$-free EtOH were subsequently added dropwise and the mixture was heated under reflux for 3 hours. The solvent was taken off and the residue was admixed with 200 $cm^3$ of $H_2O$. The organic phase was separated off, the aqueous phase was saturated with NaCl and extracted twice with 200 $cm^3$ each time of $Et_2O$. The organic phase combined with the extracts was dried ($MgSO_4$).

The residue left after taking off the solvent was taken up in 500 $cm^3$ of EtOH and 50 $cm^3$ of $H_2O$ and mixed with 56 g (1 mol) of KOH. The reaction mixture was heated under reflux for 4 hours. The solvent was taken off under reduced pressure, the residue was taken up in 500 $cm^3$ of $H_2O$ and acidified with concentrated aqueous HCl to a pH of 1. The precipitate formed was filtered off with suction and heated at 250° C. for 30 minutes in a bulb tube, with strong foaming occurring. This gave 58.3 g (85%) of 1 as a viscous oil.

$^1$H-NMR (100 MHz, $CDCl_3$): 11.7 (s, 1H, COOH), 7.1–7.5 (m, 9H, arom. H), 2.3–3.2 (m, 3H, CH and $CH_2$), 0.9 (d, 3H, $CH_3$).

2. (±)-2-Methyl-4-phenylindan-1-one (2)

A solution of 58 g (0.242 mol) of 1 in 60 $cm^3$ (0.83 mol) of thionyl chloride was stirred at room temperature for 18 hours. Excess thionyl chloride was removed at 10 mbar and the oily residue was freed of adhering residues of thionyl chloride by repeated dissolution in 100 $cm^3$ each time of toluene and taking off the toluene under reduced pressure.

The acid chloride was taken up in 150 $cm^3$ of toluene and added dropwise at 10° C. to a suspension of 48 g (0.363 mol) of $AlCl_3$ in 400 $cm^3$ of toluene. After addition was complete, the mixture was heated under reflux for 3 hours. The reaction mixture was poured onto 500 g of ice and acidified with concentrated aqueous HCl to a pH of 1. The organic phase was separated off and the aqueous phase was extracted 3 times with 100 $cm^3$ each time of $Et_2O$. The combined organic phases were washed with saturated aqueous $NaHCO_3$ solution and saturated aqueous NaCl solution and then dried (MgSO$_4$). This gave 50.4 g (93%) of 2 which was reacted further without further purification.

$^1$H-NMR (100 MHz, CDCl$_3$): 7.2–7.8 (m, 8H, arom. H), 3.3 (dd, 1H, β-H), 2.5–2.9 (m, 2H, α- and β-H), 1.3 (d, 3H, CH$_3$).

3. 2-Methyl-7-phenylindene (3)

50 g (0,226 mol) of 2 were dissolved in 450 cm$^3$ of THF/MeOH (2:1) and, while stirring at 0° C., 12.8 g (0.34 mol) of sodium borohydride were added a little at a time. The mixture was stirred for a further 18 hours. The reaction mixture was poured onto ice, acidified with concentrated HCl to a pH of 1 and extracted a number of times with Et$_2$O. The combined organic phases were washed with saturated aqueous NaHCO$_3$ solution and NaCl solution and then dried (MgSO$_4$). The solvent was removed under reduced pressure and the crude product was, without further purification, taken up in 1 dm$^3$ of toluene, admixed with 2 g of p-toluenesulfonic acid and heated under reflux for 2 hours. The reaction mixture was washed with 200 cm$^3$ of saturated aqueous NaHCO$_3$ solution and the solvent was removed under reduced pressure. The crude product was purified by filtration through 500 g of silica gel (hexane/CH$_2$Cl$_2$). This gave 42 g (90%) of 3 as a colorless oil.

$^1$H-NMR (100 MHz, CDCl$_3$): 7.0–7.6 (m, 8H, arom. H), 6.5 (m, 1H, H—C(3)), 3.4 (s, 2H, CH$_2$), 2.1 (s, 3H, CH$_3$).

4. Dimethylbis(2-methyl-4-phenylindenyl)silane (4)

A solution of 15 g (72.7 mmol) of 3 in 200 cm$^3$ of H$_2$O-free and O$_2$-free toluene and 10 cm$^3$ of H$_2$O-free and O$_2$-free THF was admixed at room temperature under argon with 29 cm$^3$ (73 mmol) of a 2.5 M solution of butyllithium in hexane and heated at 80° C. for 1 hour. Subsequently, the mixture was cooled to 0° C. and admixed with 4.7 g (36.4 mmol) of dimethyldichlorosilane. The mixture was heated at 80° C. for 1 hour and subsequently poured into 100 cm$^3$ of H$_2$O. It was extracted a number of times with Et$_2$O and the combined organic phases were dried (MgSO$_4$). The crude product left after taking off the solvent under reduced pressure was chromatographed on 300 g of silica gel (hexane/CH$_2$Cl$_2$). This gave 12.0 g (70%) of 4.

$^1$H-NMR (100 MHz, CDCl$_3$): 7.10–7.70 (m, 16H, arom. H)), 6.80 (m, 2H, H—C(3)), 3.80 (s, 2H, H—C(1)), 2.20 (m, 6H, CH$_3$), –0.20 (m, 6H, CH$_3$Si).

5. rac-Dimethylsilylbis(2-methyl-4-phenylindenyl) zirconium dichloride (5)

A solution of 6.0 g (12.9 mmol) of 4 in 100 cm$^3$ of H$_2$O-free and O$_2$-free toluene was admixed at room temperature under argon with 10.6 cm$^3$ (26 mmol) of a 2.5 M solution of butyllithium in hexane and heated under reflux for 3 hours. Subsequently, the suspension of the dilithium salt was cooled to –25° C. and admixed with 3.2 g (13.6 mmol) of zirconium tetrachloride. The mixture was warmed to room temperature over a period of 1 hour, stirred for a further 1 hour and then filtered through a G3 frit. The residue was extracted with 50 cm$^3$ of toluene and the combined filtrates were freed of solvent in an oil pump vacuum. This gave 9.0 g of the metallocene as a mixture of the racemic and meso forms in a ratio of 1:1 in the form of a yellow powder. The pure racemate (5) could be obtained by stirring the crude mixture a number of times with 20 cm$^3$ each time of methylene chloride, with the racemate remaining as a yellow crystalline powder and the meso form being washed out. This gave 2.74 g (33%) of the pure racemate.

$^1$H-NMR (300 MHz, CDCl$_3$): 7.0–7.7 (m, 16H, arom. H), 6.9 (s, 2H, H—C(3)), 2.2 (s, 6H, CH$_3$), 1.3 (m, 6H, CH$_3$Si).

Molar mass: 626 M$^+$, correct disintegration pattern.

EXAMPLE B rac-Dimethylsilanediylbis(2-methyl-4-(1-naphthyl)indenyl) zirconium dichloride (12)

1. 2-(1-Naphthyl)toluene (6)

13.9 g (0.57 mol) of magnesium turnings were covered with 150 ml of H$_2$O-free Et$_2$O and the Grignard reaction was started using 5 g of 2-bromotoluene and a few grains of iodine. Subsequently, 93 g (0.57 mol) of 1-bromotoluene in 450 ml of H$_2$O-free Et$_2$O were added dropwise at such a rate that the reaction mixture was kept at the boiling point. After addition was complete, the mixture was heated at the boiling point until the magnesium had completely reacted.

The Grignard solution was subsequently added dropwise to a solution of 118 g (0.57 mol) of 1-bromonaphthalene and 3.5 g of bis(triphenylphosphine)nickel dichloride in 800 cm$^3$ of toluene at such a rate that the internal temperature did not exceed 50° C. Subsequently, the mixture was heated under reflux for a further 3 hours, admixed with 500 ml of 10% strength aqueous HCl, the phases were separated and the organic phase was freed of solvent under reduced pressure. Filtration through silica gel (hexane) gave 115 g (92%) of 6 as a colorless oil.

$^1$H-NMR (100 MHz, CDCl$_3$): 7.2–8.0 (m, 11h, arom. H), 2.0 (s, 3H, CH$_3$).

2. 2-(1-Naphthyl)benzyl bromide (7)

114 g (0.52 mol) of 6 and 103 g (0.58 mol) of N-bromosuccinimide were dissolved at room temperature in 2000 cm$^3$ of carbon tetrachloride, admixed with 3 g of azobisisobutyronitrile and heated under reflux for 4 hours. The precipitated succinimide was filtered off, the solvent was removed under reduced pressure and the residue was purified by filtration through 1000 g of silica gel (hexane/methylene chloride 9:1). This gave 141 g (82%) of 7 as a colorless lacrymatory oil.

$^1$H-NMR (100 MHz, CDCl$_3$): 7.1–8.0 (m, 11H, arom. H), 4.2 (q, 2H, CH$_2$Br).

3. (±)-2-(2(1-Naphthyl)benzyl)propionic acid (8)

75 g (0.43 mmol) of dimethyl methylmalonate dissolved in 50 cm$^3$ of H$_2$O-free EtOH are added dropwise at room temperature to 10 g (0.43 mmol) of sodium in 100 cm$^3$ of H$_2$O-free EtOH. Subsequently, 140 g (0.43 mmol) of 7 in 200 cm$^3$ of H$_2$O-free EtOH were added dropwise and the mixture was heated under reflux for 3 hours. 85 g (1.3 mol) of KOH dissolved in 100 cm$^3$ of H$_2$O were added at room temperature and the mixture was heated under reflux for a further 4 hours. The solvents were removed under reduced pressure, the residue was admixed with H$_2$O until completely dissolved and acidified with concentrated aqueous HCl to a pH of 1. The precipitate formed was filtered off with suction, dried and heated at 130° C. for 1 hour. This gave 96 g (77%) of 8 as a viscous oil.

$^1$H-NMR (100 MHz, CDCl$_3$): 10.1 (s,1H, COOH), 6.9–8.0 (m, 11H, arom. H), 2.3–3.0 (m, 3H, CH$_2$ and CH), 0.8 (d, 3H, CH$_3$).

4. (±)-2-Methyl-4-(1-naphthyl)-1-indanone (9)

A solution of 96 g (0.33 mol) of 8 in 37 cm$^3$ (0.5 mol) of thionyl chloride was stirred at room temperature for 18 hours, excess thionyl chloride was removed at 10 mbar and the oily residue was freed of adhering residues of thionyl chloride by repeated dissolution in 100 cm$^3$ each time of toluene and taking off the toluene under reduced pressure.

The acid chloride was taken up in 200 cm$^3$ of toluene and added dropwise at 10° C. to a suspension of 44 g (0.33 mol) of AlCl$_3$ in 1000 cm$^3$ of toluene and the mixture was heated at 80° C. for 3 hours. The reaction mixture was poured onto 1000 g of ice and acidified with concentrated aqueous HCl to a pH of 1. The organic phase was separated off and the aqueous phase was extracted 3 times with 200 cm³ each time of methylene chloride. The combined organic phases were washed with saturated aqueous NaHCO₃ solution, saturated NaCl solution and subsequently dried (MgSO₄). Chromatography on 1000 g of silica gel (hexane/methylene chloride) gave 12 g (13%) of 9.

¹H-NMR (100 MHz, CDCl₃): 7.3–8.0 (m, 10H, arom. H), 2.2–3.2 (m, 3H, CH₂ and CH), 1.2 (d, 3H, CH₃).

5. 2-Methyl-7-(1-naphthyl)indene (10)

1.3 g (33 mmol) of NaBH₄ were added at 0° C. to a solution of 12 g (44 mmol) of 9 in 100 cm³ of THF/methanol (2:1) and the mixture was stirred at room temperature for 18 hours. The reaction mixture was poured onto 100 g of ice, acidified with concentrated aqueous HCl to a pH of 1 and extracted a number of times with Et₂O. The combined organic phases were washed with saturated aqueous NaHCO₃ solution, saturated aqueous NaCl solution and subsequently dried (MgSO₄).

The crude product was taken up in 200 cm³ of toluene, admixed with 0.5 g of p-toluenesulfonic acid and heated under reflux for 2 hours with a water separator. The reaction mixture was washed 3 times with 50 cm³ of saturated aqueous NaHCO₃ solution and the solvent was removed under reduced pressure. Filtration through 200 g of silica gel (hexane/methylene chloride) gave 10 g (86%) of 10 as a colorless oil.

¹H-NMR (100 MHz, CDCl₃): 7.0–8.0 (m, 10H, arom. H), 6.6 (m, 1H, CH), 3.0 (m, 2H, CH₂), 2.0 (m, 3H, CH₃).

6. Dimethylbis(2-methyl-4-(1-naphthyl)indenyl)silane (11)

A solution of 10 g (38 mmol) of 10 in 100 cm³ of H₂O-free and O₂-free toluene and 5 ml of H₂O-free and O₂-free THF was admixed at room temperature with 14.4 cm³ (50 mmol) of a 20% strength solution of butyllithium in toluene and the mixture was heated at 80° C. for 2 hours. Subsequently, the yellow suspension was cooled to 0° C. and admixed with 2.5 g (19 mmol) of dimethyldichlorosilane. The reaction mixture was heated for a further 1 hour at 80° C. and subsequently washed with 50 cm³ of H₂O. The solvent it was removed under reduced pressure and the residue was recrystallized from heptane at –20° C. This gave 8.2 g (75%) of 11 as colorless crystals.

¹H-NMR (100 MHz, CDCl₃): 7.2–8.1 (m, 20H, arom. H), 6.4 (m, 2H, H—C(3)), 4.0 (m, 2H, H—C(1)), –0.1 (s, 6H, CH₃Si).

7. rac-Dimethylsilanediylbis(2-methyl-4-(1-naphthyl) indenyl)zirconium dichloride (12)

A solution of 8.0 g (14 mmol) of 11 in 70 cm³ of H₂O-free and O₂-free Et₂O was admixed at room temperature under argon with 10.5 cm³ of a 20% strength solution of butyllithium in toluene and the mixture was subsequently heated under reflux for 3 hours. The solvent was removed under reduced pressure and the residue together with 50 ml of H₂O-free and O₂-free hexane was filtered through a G3 Schlenk frit, washed with 50 ml of H₂O-free and O₂-free hexane and dried (0.1 mbar, RT).

The dilithium salt was added at –78° C. to a suspension of 3.2 g (14 mmol) of zirconium tetrachloride in 80 cm³ of methylene chloride and the mixture was warmed to room temperature over a period of 18 hours while stirring with a magnetic stirrer. The mixture was filtered through a G3 frit and the residue was extracted with a total of 400 cm³ of methylene chloride used a little at a time. The combined filtrates were freed of solvent under reduced pressure and recrystallized from methylene chloride. This gave 1.5 g (15%) of the racemic and meso forms in a ratio of 1:1. Recrystallizing this product again from methylene chloride gave the racemic complex in the form of yellow crystals.

¹H-NMR (100 MHz, CDCl₃): 7.0–8.0 (m, 22H, arom. H), 6.5 (s, 2H, H—C(3)), 2.2 (s, 6H, CH₃), 1.3 (s, 6H, CH₃'Si).

Mass spectrum: 729 M⁺, correct disintegration pattern.

EXAMPLE C rac-Dimethylsilanediylbis(2-methyl-4-(2-naphthyl)indenyl) zirconium dichloride (19)

1. 2-(2-Naphthyl)toluene (13)

14 g (0.57 mol) of magnesium turnings were covered with 150 ml of H₂O-free Et₂O and the Grignard reaction was started using 5 g of 2-bromotoluene and a few grains of iodine. Subsequently, 95 g (0.58 mol) of bromotoluene in 450 ml of H₂O-free Et₂O were added dropwise at such a rate that the reaction mixture was kept at the boiling point. After addition was complete, the mixture was heated at the boiling point until the magnesium had completely reacted.

The Grignard solution was subsequently added dropwise to a solution of 120 g (0.57 mol) of 2-bromonaphthalene and 3.5 g of bis(triphenylphosphine)nickel chloride in 800 cm³ of toluene at such a rate that the internal temperature did not exceed 50° C. Subsequently, the mixture was heated under reflux for a further 3 hours, admixed with 500 ml of 10% strength aqueous HCl, the phases were separated and the organic phase was freed of solvent under reduced pressure. Filtration through silica gel (hexane) gave 107 g (87%) of 13 as a colorless oil.

¹H-NMR (100 MHz, CDCl₃): 7.0–7.9 (m, 11H, arom. H), 1.9 (s, 3H, CH₃).

2. 2-(2-Naphthyl)benzyl bromide (14)

105 g (0.48 mol) of 13 and 90 g (0.5 mol) of N-bromosuccinimide were dissolved at room temperature in 2000 cm³ of carbon tetrachloride, admixed with 3 g of azobisisobutryonitrile and heated under reflux for 4 hours. The precipitated succinimide was filtered off, the solvent was removed under reduced pressure and the residue was purified by filtration through 1000 g of silica gel (hexane/methylene chloride 9:1). This gave 112 g (79%) of 14 as a colorless, lacrymatory oil.

¹H-NMR (100 MHz, CDCl₃): 6.9–8.0 (m, 11H, arom. H), 4.1 (s, 2H, CH₂Br).

3. (±)-2-(2-(2-Naphthyl)benzyl)propionic acid (15)

70 g (0.37 mmol) of diethyl methylmalonate dissolved in 50 cm³ of H₂O-free EtOH were added dropwise at room temperature to 8.5 g (0.37 mmol) of sodium in 100 cm³ of H₂O-free EtOH. Subsequently, 110 g (0.37 mmol) of 14 in 200 cm³ of H₂O-free EtOH were added dropwise and the mixture was heated under reflux for 3 hours. 62 g (1.1 mol) of KOH dissolved in 100 cm³ of H₂O were added at room temperature and the mixture was heated under reflux for a further 4 hours. The solvents were removed under reduced pressure, the residue was admixed with H₂O until completely dissolved and acidified with concentrated aqueous HCl to a pH of 1. The precipitate formed was filtered off with suction, dried and heated at 130° C. for 1 hour. This gave 90 g (84%) of 15 as a viscous oil.

¹H-NMR (100 MHz, CDCl₃): 10.9 (s, 1H, COOH), 7.0–8.1 (m, 11H, arom. H), 2.3–3.0 (m, 3H, CH₂ and CH), 1.0 (d, 3H, CH₃).

4. (±)-2-Methyl-4-(2-naphthyl)-1-indanone (16)

A solution of 89 g (0.31 mol) of 15 in 37 cm³ (0.5 mol) of thionyl chloride was stirred at room temperature for 18 hours, excess thionyl chloride was removed at 10 mbar and the oily residue was freed of adhering residues of thionyl chloride by repeated dissolution in 100 cm³ each time of toluene and taking off the toluene under reduced pressure.

The acid chloride was taken up in 200 cm³ of toluene and added dropwise at 10° C. to a suspension of 44 g (0.33 mol) of AlCl₃ in 1000 cm³ of toluene and the mixture was heated at 80° C. for 3 hours. The reaction mixture was poured onto 1000 g of ice and acidified with concentrated aqueous HCl to a pH of 1. The organic phase was separated off and the aqueous phase was extracted 3 times with 200 cm³ each time of methylene chloride. The combined organic phases were washed with saturated aqueous NaHCO₃ solution, saturated aqueous NaCl solution and subsequently dried (MgSO₄). Chromatography on 1000 g of silica gel (hexane/AcOEt) gave 27 g (33%) of 16.

$^1$H-NMR (100 MHz, CDCl₃): 7.1–8.0 (m, 10H, arom. H), 2.2–3.3 (m, 3H, CH₂ and CH), 1.1 (d, 3H, CH₃).

5. 2-Methyl-7-(2-naphthyl)indene (17)

3.8 g (100 mmol) of NaBH₄ were added at 0° C. to a solution of 27 g (100 mmol) of 16 in 200 cm³ of THF/methanol (2:1) and the mixture was stirred at room temperature for 18 hours. The reaction mixture was poured onto 100 g of ice, acidified with concentrated aqueous HCl to a pH of 1 and extracted a number of times with Et₂O. The combined organic phases were washed with saturated aqueous NaHCO₃ solution, saturated aqueous NaCl solution and subsequently dried (MgSO₄).

The crude product was taken up in 500 cm³ of toluene, admixed with 1.5 g of p-toluenesulfonic acid and heated under reflux for 2 hours with a water separator. The reaction mixture was washed 3 times with 50 cm³ of saturated aqueous NaHCO₃ solution and the solvent was removed under reduced pressure. Filtration through 200 g of silica gel (hexane/methylene chloride) gave 18.4 g (72%) of 17 as a colorless oil.

$^1$H-NMR (100 MHz, CDCl₃): 7.0–8.0 (m, 10H, arom. H), 6.6 (m, 1H, CH), 3.0 (m, 2H, CH₂), 2.0 (m, 3H, CH₃).

6. Dimethylbis(2-methyl-4-(2-naphthyl)indenyl)silane (18)

A solution of 18 g (70 mmol) of 17 in 70 cm³ of H₂O-free and O₂-free toluene and 4 ml of H₂O-free and O₂-free THF was admixed at room temperature with 26 cm³ (70 mmol) of a 20% strength solution of butyllithium in toluene and the mixture was heated at 80° C. for 2 hours. Subsequently, the yellow suspension was cooled to 0° C. and admixed with 4.5 g (35 mmol) of dimethyldichlorosilane. The reaction mixture was heated for a further 1 hour at 80° C. and subsequently washed with 50 cm³ of H₂O. The solvent was removed under reduced pressure and the residue was recrystallized from heptane at −20° C. This gave 19.8 g (54%) of 18 as colorless crystals.

$^1$H-NMR (100 MHz, CDCl₃): 7.0–8.1 (m, 20H, arom. H), 6.4 (m, 2H, H—C(3)), 4.0 (m, 2H, H—C(1)), −0.1 (1, 6H, CH₃Si).

7. rac-Dimethylsilanediylbis(2-methyl-4-(2-naphthyl)indenyl)zirconium dichloride (19)

A solution of 10.5 g (19 mmol) of 18 in 70 cm³ of H₂O-free and O₂-free Et₂O was admixed at room temperature under argon with 13.6 cm³ of a 20% strength solution of butyllithium in toluene and the mixture was subsequently heated under reflux for 3 hours. The solvent was removed under reduced pressure and the residue together with 50 ml of H₂O-free and O₂-free hexane was filtered through a G3 Schlenk frit, washed with 50 ml of H₂O-free and O₂-free hexane and dried (0.1 mbar, RT).

The dilithium salt was added at −78° C. to a suspension of 4.2 g (18 mmol) of zirkonium tetrachloride in 80 cm³ of methylene chloride and the mixture was warmed to room temperature over a period of 18 hours while stirring with a magnetic stirrer. The mixture was filtered through a G3 frit and the residue was extracted with a total of 400 cm³ of methylene chloride used a little at a time. The combined filtrates were freed of solvent under reduced pressure and recrystallized from methylene chloride. This gave 3.1 g (23%) of the racemic and meso forms in a ratio of 1:1. Recrystallizing this product again from methylene chloride gave the racemic complex in the form of yellow crystals.

$^1$H-NMR (100 MHz, CDCl₃): 7.0–8.0 (m, 22H, arom. H), 6.9 (s, 2H, H—C(3)), 2.2 (s, 6H, CH₃), 1.3 (s, 6H, CH₃Si).

Mass spectrum: 729 M⁺, correct disintegration pattern.

EXAMPLE D

Dimethylsilanediylbis(2-methyl-4-(9-phenanthryl)indenyl)zirconium dichloride (24)

1. 2-(2'-(9"-Phenanthryl)benzyl)propionic acid (20)

174 g (1.0 mol) of diethyl methylmalonate were added dropwise at room temperature to 23 g (1.0 mol) of sodium in 500 cm³ of H₂O-free EtOH. Subsequently, 347 g (1.0 mol) of 2-(9-phenanthryl)benzyl bromide were added dropwise and the mixture was heated under reflux for 3 hours. 168 g (3 mol) of KOH dissolved in 600 cm³ of H₂O were added at room temperature and the mixture was heated under reflux for a further 4 hours. The EtOH was distilled off and the residue was admixed with H₂O until completely dissolved and subsequently acidified with concentrated aqueous HCl to a pH of 1. The precipitate formed was filtered off with suction, dried and heated at 130° C. for 1 hour. This gave 286 g (84%) of 2-(2'-(9"-phenanthryl)benzyl)propionic acid as a solid.

2. 2-Methyl-4-(9'-phenanthryl)-1-indanone (21)

A solution of 200 g (0.59 mol) of 2-(2'-(9"-phenanthryl)benzyl)-propionic acid in 81 cm³ (1.2 mol) of thionyl chloride was stirred at room temperature for 18 hours. Excess thionyl chloride was removed at 10 mbar and the acid chloride was taken up in 600 cm³ of toluene. The solution was added dropwise at 10° C. to a suspension of 86 g (0.64 mol) of AlCl₃ in 1100 cm³ of toluene and the mixture was heated at 80° C. for 1 hour. The reaction mixture was poured onto 2000 g of ice and acidified with concentrated aqueous HCl to a pH of 1. The organic phase was separated off and the aqueous phase was extracted 3 times with 200 cm³ each time of methyl tert-butyl ether. The combined organic phases were washed with saturated aqueous NaHCO₃ solution, saturated aqueous NaCl solution and subsequently dried (MgSO₄). This gave 151 g (56%) of 2-methyl-4-(9'-phenanthryl)-1-indanone which was reacted further without further purification.

3. 2-Methyl-7-(9'-phenanthryl)indene (22)

11.7 g (0.31 mol) of NaBH₄ were added a little at a time at 0° C. to a solution of 100 g (0.31 mol) of 2-methyl-4-(9'-phenanthryl)-1-indanone in 1000 cm³ of THF/methanol (2:1) and the mixture was stirred at room temperature for 18 hours. The reaction mixture was poured onto 1000 g of ice, acidified with concentrated aqueous HCl to a pH of 1 and extracted a number of times with methyl tert-butyl ether. The combined organic phases were washed with saturated aqueous NaHCO₃ solution and saturated aqueous NaCl solution. The solvent was removed under reduced pressure and the crude product was taken up in 1000 cm³ of toluene, admixed with 3 g of p-toluenesulfonic acid and heated under reflux for 2 hours with a water separator. The reaction mixture was washed 3 times with 250 cm³ of saturated aqueous NaHCO₃ solution and the solvent was removed under reduced pressure. Chromatography on silica gel (hexane) gave 64 g (68%) of 2-methyl-7-(9'-phenanthryl)indene as a colorless oil.

4. Dimethylbis(2-methyl-4-(9'-phenanthryl)indenyl)silane (23)

A solution of 25 g (81 mmol) of 2-methyl-7-(9'-phenanthryl)indene in 250 cm³ of H₂O-free and O₂-free toluene and 25 ml of H₂O-free and O₂-free THF was admixed at room temperature with 30 cm³ (81 mmol) of a 20% strength solution of butyllithium in toluene and heated at 80° C. for 2 hours. Subsequently, the yellow suspension was cooled to 0° C. and admixed with 5.1 g (40 mmol) of dimethyldichlorosilane. The reaction mixture was heated for a further 1 hour at 80° C. and subsequently washed with 200 cm³ of H₂O. The solvent was removed under reduced pressure and the residue was purified by crystallization (hexane). This gave 13.2 g (49%) of dimethylbis(2-methyl-4-(9'-phenanthryl)indenyl)silane as a colorless solid.

5. Dimethylsilanediylbis(2-methyl-4-(9'-phenanthryl)indenyl)zirconium dichloride (24)

A solution of 10 g (15 mmol) of dimethylbis(2-methyl-4-(9'-phenanthryl)indenyl)silane in 50 cm³ of H₂O-free and O₂-free Et₂O was admixed at room temperature under argon with 11 cm³ of a 20% strength solution of butyllithium in toluene and subsequently heated under reflux for 3 hours. The solvent was removed under reduced pressure and the residue together with 50 ml of H₂O-free and O₂-free hexane was filtered through a G3 Schlenk frit, washed with 100 ml of H₂O-free and O₂-free hexane and dried (0.1 mbar, RT). The solid was added at –78° C. to a suspension of 3.5 g (15 mmol) of zirconium tetrachloride in 100 cm³ of methylene chloride and the mixture was warmed to room temperature over a period of 18 hours while stirring with a magnetic stirrer. The mixture was filtered through a G3 frit and the residue was extracted with a total of 300 cm³ of methylene chloride used a little at a time. The combined filtrates were freed of solvent under reduced pressure and recrystallized again from dichloromethane (–30° C.). This gave 3.5 g (28%) of the racemic and meso forms in a ratio of 1:1. Recrystallizing this product again from dichloromethane (0° C.) gave the racemic complex rac-dimethylsilanediylbis(2-methyl-4-(9'-phenanthryl)indenyl)zirconium dichloride in the form of yellow crystals.

¹H-NMR (100 MHz, CDCl₃): 7.0–8.1 and 8.7 (m, 18H, arom. H), 6.4 (s, 2H, H—C(3)), 2.2 (s, 6H, CH₃), 1.3 (s, 6H, CH₃Si).

Mass spectrum: 829 M⁺, correct disintegration pattern.

EXAMPLE E
Dimethylsilanediylbis(2-methyl-4-(3',5'-diisopropylphenyl)indenyl)zirconium dichloride (26)
1. 2-Methyl-7-(3',5'-diisopropylphenyl)indene (25)

The procedure of Examples D.1–D.3 was repeated. The 2-(9'-phenanthryl)benzyl bromide was replaced by 331.3 g (1.0 mol) of 2-(3',5'-diisopropylphenyl)benzyl bromide to give 111 g (0.38 mol) of 2-methyl-7-(3',5'-diisopropylphenyl)indene (23 g (1.0 mol) of sodium. 174 g (1.0 mol) of diethyl methylmalonate, 168 g (3.0 mol) of KOH; 269 g (0.83 mol) of 2-(2-(3',5'-diisopropylphenyl)benzyl)propionic acid, 195 g (1.64 mol) of SOCl₂, 121.8 g (0.913 mol) of AlCl₃; 165 g (0.54 mol) of 2-methyl-4-(3',5'-diisopropylphenyl)-1-indanone; 20.4 g of NaBH₄, 3 g of p-TsOH).

2. Dimethylsilanediylbis(2-methyl-4-(3',5'-diisopropylphenyl)indenyl)zirconium dichloride (26)

The procedure of Example D.4 was repeated. The 2-methyl-7-(9'-phenanthryl)indene was replaced by 20 g (69 mmol) of 2-methyl-7-(3',5'-diisopropylphenyl)indene to give 15.6 g (70%) of dimethylbis(2-methyl-4-(3',5'-diisopropylphenyl)indenyl)silane (26 ml (69 mmol) of butyllithium (20% in toluene), 4.5 g (35 mmol) of dimethyldichlorosilane).

The synthesis of the complex was carried out using a method similar to Example D.5. The dimethylbis(2-methyl-4-(9-phenanthryl)indenyl)silane was replaced by 10 g (16 mmol) of dimethylbis(2-methyl-4-(3',5'-diisopropylphenyl)indenyl)silane to give 6.9 g (54%) of the racemic and meso froms in a ratio of 1:1 (12 ml (232 mmol) of butyllithium (20% strength in toluene), 3.7 g (16 mmol) of zirconium tetrachloride). Recrystallizing this product again from chlorobenzene gave the racemic complex rac-dimethylsilanediylbis(2-methyl-4-(3',5'-diisopropylphenyl)indenyl)zirconium dichloride in the form of yellow crystals.

¹H-NMR (100 MHz, CDCl₃): 7.0–8.3 (m, 12H, arom. H), 6.6 (s, 2H, H—C(3), 2.5–3.1 (m, 4H, iPr—CH), 2.1 (s, 6H, CH₃), 1.0–1.3 (m, 30H, iPr—CH₃ and CH₃Si). Mass spectrum: 797 M⁺, correct disintegration pattern.

EXAMPLE F
Dimethylsilanediylbis(2-methyl-4-phenyl-6-isopropylindenyl)zirconium dichloride (28)
1. 2-Methyl-5-isopropyl-7-phenylindene (27)

The procedure of Examples D.1–D.3 was repeated. The 2-(9'-phenanthryl)benzyl bromide was replaced by 289 g (1.0 mol) of 2-phenyl-4-isopropylbenzyl bromide to give 85 g (0.34 mol) of 2-methyl-7-(3',5'-diisopropylphenyl)indene (23 g (1.0 mol) of sodium, 174 g (1.0 mol) of diethyl methylmalonate, 168 g (3.0 mol) of KOH; 251 g (0.89 mol) of 2-(2'-phenyl-4'-isopropylbenzyl)propionic acid, 212 g (1.78 mol) of SOCl₂, 130 g (0.98 mol) of AlCl₃; 127 g (0.48 mol) of 2-methyl-4-phenyl-6-isopropyl-1-indanone; 18.1 g of NaBH₄, 2.5 g of p-TsOH).

2. Dimethylsilanediylbis(2-methyl-4-phenyl-6-isopropyl)indenyl)zirconium dichloride (28)

The procedure of Example D.4 was repeated. The 2-methyl-7-(9'-phenanthryl)indene was replaced by 20 g (80 mmol) of 2-methyl-5-isopropyl-7-phenylindene to give 13.5 g (61%) of dimethylbis(2-methyl-4-phenyl-6-isopropyl)indenyl)silane (30 ml (80 mmol) of butyllithium (20% strength in toluene), 5.2 g (40 mmol) of dimethyldichlorosilane).

The synthesis of the complex was carried out using a method similar to Example D.5. The dimethylbis(2-methyl-4-(9'-phenanthryl)indenyl)silane was replaced by 10 g (14 mmol) of dimethylbis(2-methyl-4-phenyl-6-isopropyl)indenyl)silane to give 4.4 g (44%) of the racemic and meso forms in a ratio of 1:1 (10 ml (28 mmol) of butyllithium (20% strength in toluene), 3.3 g (14 mmol) of zirconium tetrachloride). Recrystallizing this product again from dichloromethane gave the racemic complex rac-dimethylsilanediylbis(2-methyl-4-phenyl-6-isopropyl)indenyl)zirconium dichloride in the form of yellow crystals.

¹H-NMR (100 MHz, CDCl₃): 7.0–8.3 (m, 12H, arom. H), 6.6 (s, 2H, H—C(3), 2.5–2.9 (m,2H, iPr—CH), 2.1 (s, 6H, CH₃), 1.2 (s, 6H, CH₃Si), 1.1 (d, 12H, iPr—CH₃). Mass spectrum: 712 M⁺, correct disintegration pattern.

EXAMPLE G
Dimethylsilanediylbis(2-methyl-4-(5',6',7',8'-tetrahydro-1'-naphthyl)indenyl)zirconium dichloride (30)
1. 2-Methyl-7-(5',6',7',8'-tetrahydro-1'-naphthyl)indene (29)

The procedure of Examples D.1–D.3 was repeated. The 2-(9'-phenanthryl)benzyl bromide was replaced by 301 g (1.0 mol) of 2-(5',6',7',8'-tetrahydro-1'-naphthyl)benzyl bromide to give 160 g (0.61 mol) of 2-methyl-7-(5',6',7',8'-tetrahydro-1'-naphthyl)indene (23 g (1.0 mol) of sodium, 174 g (1.0 mol) of diethyl methylmalonate, 168 g (3.0 mol) of KOH; 270 g (0.92 mol) of 2-(2-(5',6',7',8'-tetrahydro-1'-naphthyl)benzyl)propionic acid, 219 g (1.84 mol) of SOCl₂, 133 g (1.0 mol) of AlCl₃; 222 g (0.80 mol) of 2-methyl-4-(5',6',7',8'-tetrahydro-1'-naphthyl)-1-indanone; 30 g (0.80 mol) of NaBH₄, 4 g of p-TsOH).

2. Dimethylsilanediylbis(2-methyl-4-(5',6',7',8'-tetrahydro-1'-naphthyl)indenyl)zirconium dichloride (30)

The procedure of Example D.4 was repeated. The 2-methyl-7-(9'-phenanthryl)indene was replaced by 20 g (76 mmol) of 2-methyl-7-(5',6',7',8'-tetrahydro-1'-naphthyl) indene to give 10.5 g (48%) of dimethylbis(2-methyl-4-(5', 6',7',8'-tetrahydro-1'-naphthyl)indenyl)silane (28 ml (76 mmol) of butyllithium (20% strength in toluene), 4.9 g (38 mmol) of dimethyldichlorosilane). The synthesis of the complex was carried out using a method similar to Example D.5. The dimethylbis(2-methyl-4-(9'-phenanthryl)indenyl) silane was replaced by 10 g (17 mmol) of dimethylbis(2-methyl-4-(5',6',7',8'-tetrahydro-1'-naphthyl)indenyl)silane to give 8.1 g (65%) of the racemic and meso forms in a ratio of 1:1 (13 ml (34 mmol) of butyllithium (20% strength in toluene), 3.9 g (17 mmol) of zirconium tetrachloride). Recrystallizing this product again from toluene gave the racemic complex rac-dimethylsilanediylbis(2-methyl-4-(5', 6',7',8'-tetrahydro-1'-naphthyl)indenyl)zirconium dichloride in the form of yellow crystals.

$^1$H-NMR (100 MHz, CDCl$_3$): 7.0–8.3 (m, 12H, arom. H), 6.6 (s, 2H, H—C(3), 2.7 (m, 8H,CH$_2$), 2.1 (s, 6H, CH$_3$), 1.8 (m, 8H, CH$_2$),1.2 (s, 6H, CH$_3$Si). Mass spectrum: 737 M$^+$, correct disintegration pattern.

EXAMPLE H

Dimethylsilanediylbis(2-methyl-4-(1-naphthyl)-6-isopropyl)indenyl)zirconium dichloride (32)

1. 2-Methyl-5-isopropyl-7-(1-naphthyl)indene (31)

The procedure of Examples D.1–D.3 was repeated. The 2-(9'-phenanthryl)benzyl bromide was replaced by 339 g (1.0 mol) of 2-(1-naphthyl)4-isopropylbenzyl bromide to give 101 g (0.34 mol) of 2-methyl-5-isopropyl-7-(1-naphthyl)indene (23 g (1.0 mol) of sodium, 174 g (1.0 mol) of diethyl methylmalonate, 168 g (3.0 mol) of KOH; 296 g (0.89 mol) of 2-(2'-(1-naphthyl)-4'-isopropylbenzyl) propionic acid, 212 g (1.78 mol) of SOCl$_2$, 130 g (0.98 mol) of AlCl$_3$; 151 g (0.48 mol) of 2-methyl-4-(1-naphthyl)-6-isopropyl-1-indanone; 18.1 g of NaBH$_4$, 2.5 g of p-TsOH).

2. Dimethylsilanediylbis(2-methyl-4-(1-naphthyl)-6-isopropyl)indenyl)zirconium dichloride (32)

The procedure of Example D.4 was repeated. The 2-methyl-7-(9'-phenanthryl)indene was replaced by 24 g (80 mmol) of 2-methyl-5-isopropyl-7-(1-naphthyl)indene to give 15.91 g (61%) of dimethylbis(2-methyl-4-(1-naphthyl)-6-isopropyl)indenyl)silane (30 ml (80 mmol) of butyllithium (20% strength in toluene), 5.2 g (40 mmol) of dimethyldichlorosilane).

The synthesis of the complex was carried out using a method similar to Example D.5. The dimethylbis(2-methyl-4-(9'-phenanthryl)indenyl)silane was replaced by 9.1 g (14 mmol) of dimethylbis(2-methyl-4-(1-naphthyl)-6-isopropyl) indenyl)silane to give 5.0 g (44%) of the racemic and meso forms in a ratio of 1:1 (10 ml (28 mmol) of butyllithium (20% strength in toluene), 3.3 g (14 mmol) of zirconium tetrachloride). Recrystallizing this product again from dichloromethane gave the racemic complex rac-dimethylsilanediylbis(2-methyl-4-phenyl-6-isopropyl) indenyl)zirconium dichloride in the form of yellow crystals.

$^1$H-NMR (100 MHz, CDCl$_3$): 7.0–8.3 (m, 16H, arom. H), 6.5 (s, 2H, H—C(3)), 2.5–2.9 (m, 2H, iPr—CH), 2.2 (s, 6H, CH$_3$), 1.1 (s, 6H, CH$_3$Si), 1.0 (d, 12H, iPr—CH$_3$). Mass spectrum: 811 M$^+$, correct disintegration pattern.

II. Application of the metallocenes from Examples A to H to a support

Examples A to H of application to a support

As described on pages 12 to 14, the supported aluminum compound (methylaluminoxane on silica gel Grace/Davison 948 "FMAO on SiO$_2$" was prepared first. The solid isolated contained 20.6% by weight of aluminum.

40 g of "FMAO on SiO$_2$" (305 mmol of Al) were suspended in a stirrable vessel in 250 cm$^3$ of toluene and cooled to 0° C. At the same time 450 mg of the metallocene (from Examples A to H) were dissolved in 200 cm$^3$ of toluene and added dropwise to the suspension over a period of 30 minutes. The mixture was slowly warmed to 20° C. while stirring, with the suspension taking on a pale red color. After 1 hour at 60° C., the mixture is again cooled to 20° C., filtered and the solid is washed 3 times with 200 cm$^3$ each time of toluene and once with 200 cm$^3$ of hexane. The remaining hexane-moist filter residue was dried under reduced pressure. For the yield of free-flowing supported catalyst, see Table "Examples of application to a support". This table also shows the contents of fixed metallocene on the support which could be achieved with the various metallocenes.

Examples A–H of application to a support (Table)

| Metallocene from Synthesis Example | Yield of catalyst (g) | Metallocene content of the catalyst [mg of zirconocene/ g of cat] |
| --- | --- | --- |
| A | 35.7 | 10.1 |
| B | 37.8 | 10.7 |
| C | 36.5 | 10.3 |
| D | 35.0 | 10.2 |
| E | 39.1 | 10.0 |
| F | 38.5 | 9.2 |
| G | 39.0 | 10.9 |
| H | 39.2 | 10.5 |

III. Polymerization Examples

EXAMPLES 1–10

A dry 24 dm$^3$ reactor was flushed with propylene and charged with 12 dm$^3$ of liquid propylene and 22 cm$^3$ of a triisobutylaluminum solution in hexane (8 mmol of Al, 2 cm$^3$ of triisobutylaluminum diluted with 20 cm$^3$ of hexane) and the reactor stirring was set to 250 rpm. After addition of a third of the total amount of ethylene to be polymerized (see Table 1, Initial charge of ethylene), 0.7 g of the catalyst prepared in Example B of application to a support, suspended in 25 cm$^3$ of a dearomatized petroleum fraction having a boiling range from 100 to 120° C., was introduced into the reactor. The reactor was heated to the polymerization temperature of 65° C. (7.5° C./min) and held for 1 hour at this polymerization temperature by cooling the reactor jacket. During this polymerization time, further ethylene gas was metered continuously into the reactor (see Table 1, ethylene metered in). The polymerization was stopped by rapid venting of the excess monomers. The polymer was dried under reduced pressure. Polymer yield, metallocene activities and product data are shown in Table 1.

EXAMPLES 11–20

Examples 1–10 were repeated using the catalyst prepared in Example D of application to a support. Amounts of ethylene, polymer yield, metallocene activities and product data are shown in Table 2.

COMPARATIVE EXAMPLES 21–30

Examples 1–10 were carried out using the metallocene catalyst not according to the invention prepared in Example A of application to a support. The results show that although this catalyst system enables the polymer melting points to be lowered in the same way, the achievable molar mass is significantly lower than when using the catalyst systems B and D in the corresponding Examples 1 to 20. Polymer yields, metallocene activities and product data are shown in Table 3.

COMPARATIVE EXAMPLES 36–42

Similarly to Examples 31–35, Example 7 was repeated using the metallocenes not according to the invention:

TABLE 1

| Example | Initial charge of ethylene (g) | Ethylene metered in (g/h) | Polymer yield (kg) | Metallocene activity [kg of PP/g of met. × h] | MFI (230/5) (dg/min) | VN [cm$^3$/g] | Polymer data Ethylene content (% by weight) | $M_w$ (g/mol) | $M_w/M_n$ | Mp (° C.) |
|---|---|---|---|---|---|---|---|---|---|---|
| 1 | 30 | 60 | 1.35 | 180.2 | 0.8 | 598 | 0.8 | 685000 | 2.2 | 145 |
| 2 | 40 | 80 | 1.55 | 206.9 | 1.2 | 498 | 1.7 | 525000 | 2.4 | 137 |
| 3 | 50 | 100 | 1.72 | 229.6 | 1.3 | 485 | 1.8 | 500000 | 2.3 | 136 |
| 4 | 70 | 140 | 1.90 | 253.7 | 1.0 | 514 | 2.0 | 518000 | 2.1 | 135 |
| 5 | 80 | 160 | 1.60 | 213.6 | 1.0 | 515 | 2.2 | 539500 | 2.8 | 134 |
| 6 | 90 | 180 | 1.40 | 186.9 | 1.2 | 500 | 2.9 | 503000 | 2.3 | 133 |
| 7 | 100 | 200 | 1.90 | 253.7 | 1.0 | 532 | 3.1 | 565000 | 2.7 | 132 |
| 8 | 150 | 300 | 2.05 | 273.7 | 2.0 | 484 | 4.4 | 507500 | 2.6 | 127 |
| 9 | 250 | 500 | 1.85 | 247.0 | 2.5 | 431 | 7.1 | 412000 | 2.4 | 116 |
| 10 | 300 | 600 | 1.65 | 220.3 | 2.7 | 415 | 10.5 | 454000 | 3.0 | 105 |

TABLE 2

| Example | Initial charge of ethylene (g) | Ethylene metered in (g) | Polymer yield (kg) | Metallocene activity [kg of PP/g of met. × h] | MFI (230/5) (dg/min) | VN [cm$^3$/g] | Polymer data Ethylene content (% by weight) | $M_w$ (g/mol) | $M_w/M_n$ | Mp (° C.) |
|---|---|---|---|---|---|---|---|---|---|---|
| 11 | 30 | 60 | 1.0 | 140.0 | 1.0 | 537 | 0.5 | 572500 | 2.0 | 149 |
| 12 | 40 | 80 | 0.95 | 133.1 | 1.3 | 478 | 1.2 | 502500 | 2.6 | 145 |
| 13 | 50 | 100 | 1.3 | 182.1 | 1.4 | 435 | 1.4 | 468000 | 2.4 | 144 |
| 14 | 70 | 140 | 1.1 | 154.1 | 1.3 | 407 | 1.7 | 415500 | 2.2 | 143 |
| 15 | 80 | 160 | 1.5 | 210.1 | 1.5 | 400 | 1.9 | 432000 | 2.4 | 140 |
| 16 | 90 | 180 | 1.3 | 182.1 | 1.5 | 390 | 2.4 | 419000 | 2.3 | 135 |
| 17 | 100 | 200 | 1.4 | 196.1 | 1.7 | 379 | 2.7 | 398500 | 3.0 | 134 |
| 18 | 150 | 300 | 1.2 | 168.1 | 2.5 | 398 | 4.0 | 412000 | 2.8 | 125 |
| 19 | 250 | 500 | 1.25 | 175.1 | 3.7 | 385 | 5.9 | 379500 | 2.5 | 119 |
| 20 | 300 | 600 | 1.3 | 182.1 | 4.1 | 365 | 8.3 | 369000 | 2.6 | 112 |

TABLE 3

| Comparative Example | Initial charge of ethylene (g) | Ethylene metered in (g) | Polymer yield (kg) | Metallocene activity [kg of PP/g of met. × h] | MFI (230/5) (dg/min) | VN [cm$^3$/g] | Polymer data Ethylene content (% by weight) | $M_w$ (g/mol) | $M_w/M_n$ | Mp (° C.) |
|---|---|---|---|---|---|---|---|---|---|---|
| C21 | 30 | 60 | 1.50 | 204.1 | 2.0 | 439 | 0.7 | 476500 | 2.0 | 146 |
| C22 | 40 | 80 | 1.65 | 224.5 | 3.7 | 362 | 1.5 | 402000 | 2.3 | 144 |
| C23 | 50 | 100 | 1.40 | 190.5 | 4.2 | 349 | 1.6 | 378500 | 2.5 | 144 |
| C24 | 70 | 140 | 1.32 | 179.6 | 5.0 | 310 | 1.8 | 345000 | 2.3 | 137 |
| C25 | 80 | 160 | 1.28 | 174.1 | 4.9 | 305 | 2.0 | 317500 | 2.8 | 135 |
| C26 | 90 | 180 | 1.40 | 180.5 | 6.5 | 285 | 2.5 | 305000 | 3.2 | 134 |
| C27 | 100 | 200 | 1.35 | 183.7 | 7.0 | 269 | 2.8 | 298500 | 3.0 | 133 |
| C28 | 150 | 300 | 1.41 | 191.8 | 11.8 | 239 | 4.5 | 225500 | 2.7 | 129 |
| C29 | 250 | 500 | 1.33 | 181.0 | 20 | 221 | 6.5 | 215000 | 2.5 | 117 |
| C30 | 300 | 600 | 1.45 | 197.3 | 31 | 204 | 9.2 | 198500 | 2.4 | 108 |

EXAMPLES 31–35

Example 7 was repeated, but the catalysts used were the supported metallocenes shown in Table 4. The results of the polymerization are likewise shown in Table 4.

rac-dimethylsilanediylbis(indenyl)ZrCl$_2$ (Example 36)
rac-dimethylsilanediylbis(2-methylindenyl)ZrCl$_2$ (Example 37)
rac-dimethylsilanediylbis(2,4-dimethylindenyl)ZrCl$_2$ (Example 38)

rac-dimethylsilanediylbis(2,4,6-trimethylindenyl)ZrCl$_2$ (Example 39)
rac-dimethylsilanediylbis(2,4,7-trimethylindenyl)ZrCl$_2$ (Example 40)
rac-dimethylsilanediylbis(2,5,6-trimethylindenyl)ZrCl$_2$ (Example 41)
rac-dimethylsilanediylbis(2-methyl-4,5-benzoindenyl)ZrCl$_2$ (Example 42)

None of the polymerizations were able to give a copolymer having a high molar mass; the VN values which could be achieved were generally below 200 cm$^3$/g, in some cases even significantly below 100 cm$^3$/g.

TABLE 4

| Example | Catalyst from Example of application to a support | Metallocene activity [kg of PP/g of met. × h] | MFI (230/5) [dg/min] | VN [cm$^3$/g] | Ethylene content [% by weight] | Mp. [° C.] |
|---|---|---|---|---|---|---|
| 31 | C | 159.8 | 1.1 | 498 | 3.0 | 133 |
| 32 | E | 174.5 | 0.9 | 515 | 2.9 | 133 |
| 33 | F | 197.5 | 1.8 | 387 | 3.1 | 134 |
| 34 | G | 238.0 | 1.3 | 417 | 2.8 | 133 |
| 35 | H | 251.5 | 0.8 | 535 | 2.7 | 132 |

EXAMPLES 43–48

A dry 24 dm$^3$ reactor was charged with 10 l of a dearomatized petroleum fraction having a boiling range from 100 to 120° C.

The gas space was then flushed by pressurization with 2 bar of propylene and depressurization, carried out five times. After addition of 2000 g of propylene and the initial charge of ethylene indicated in Table 5, 10 cm$^3$ of methylaluminoxane solution in toluene (corresponding to 15 mmol of Al, molar mass according to cryoscopic determination: 1200 g/mol) were added and the contents of the reactor were heated to 60° C. 2.0 mg of dimethylsilanediylbis(2-methyl-4-(1-naphthyl)indenyl)zirconium dichloride were dissolved in 10 cm$^3$ of the methylaluminoxane solution in toluene (corresponding to 15 mmol of Al) and likewise introduced into the reactor. During the polymerization time, now two hours, the amount of ethylene indicated in Table 5 ("ethylene metered in") was additionally metered in. The polymerization was stopped by rapid venting of the excess monomers. The polymer was separated from the petroleum spirit and dried at 100° C. under reduced pressure. Polymer yields, metallocene activities and product data are shown in Table 5.

EXAMPLES 49–54

Example 45 was repeated, but with the metallocene dimethylsilanediylbis(2-methyl-4-(1-naphthyl)indenyl) zirconium dichloride being replaced by the metallocenes of the invention:

dimethylsilanediylbis(2-methyl-4-(2-naphthyl)indenyl)ZrCl$_2$ (Example 49)
dimethylsilanediylbis(2-methyl-4-(9-phenanthryl)indenyl)ZrCl$_2$ (Example 50)
dimethylsilanediylbis(2-methyl-4-(3',5'-diisopropylphenyl)indenyl)ZrCl$_2$ (Example 51)
dimethylsilanediylbis(2-methyl-4-phenyl-6-isopropyl)indenyl)ZrCl$_2$ (Example 52)
dimethylsilanediylbis(2-methyl-4-(5',6',7',8'-tetrahydro-1'-naphthyl)indenyl)ZrCl$_2$ (Example 53)
dimethylsilanediylbis(2-methyl-4-(1-naphthyl)-6-isopropyl)indenyl)ZrCl$_2$ (Example 54).

The results of the polymerizations are shown in Table 5.

COMPARATIVE EXAMPLE 55

Example 45 was repeated, but the metallocene used was the compound dimethylsilanediylbis(2-methyl-4-phenylindenyl)zirconium dichloride which is not according to the invention. The results of the polymerization are shown in Table 5. It is clear that the molar mass achievable using this metallocene is significantly below that which can be achieved using the metallocenes of the invention.

In addition, Comparative Example 55 was also repeated using the metallocenes employed in Comparative Examples 36–42. The molar masses of the copolymers thus prepared gave maximum VN values of 137 cm$^3$/g and are thus even lower than that achieved using the metallocenes not according to the invention indicated in Example 55.

TABLE 5

| | | | | | Polymer data | | | | |
|---|---|---|---|---|---|---|---|---|---|
| Example | Initial charge of ethylene (g) | Ethylene metered in (g/h) | Polymer yield (kg) | Metallocene activity [kg of PP/g of met. × h] | VN [cm$^3$/g] | Ethylene content (% by weight) | $M_w$ (g/mol) | $M_w/M_n$ | Tg (° C.) |
| 43 | 150 | 150 | 1.25 | 312 | 425 | 29.3 | 445000 | 2.9 | −35 |
| 44 | 200 | 200 | 1.30 | 325 | 379 | 33.5 | 398000 | 2.5 | −45 |
| 45 | 300 | 300 | 1.54 | 385 | 405 | 45.0 | 407500 | 2.4 | −49 |
| 46 | 450 | 450 | 2.0 | 500 | 365 | 52.5 | 389500 | 2.7 | −58 |
| 47 | 600 | 600 | 1.85 | 463 | 358 | 60.5 | 379500 | 2.6 | −53 |
| 48 | 750 | 750 | 2.15 | 538 | 387 | 69.9 | 402000 | 2.5 | −45 |
| 49 | 300 | 300 | 1.35 | 338 | 378 | 46.5 | 395000 | 2.4 | −48 |
| 50 | 300 | 300 | 1.10 | 275 | 295 | 43.7 | 305000 | 2.6 | −46 |
| 51 | 300 | 300 | 1.78 | 445 | 358 | 48.0 | 329000 | 2.3 | −51 |

TABLE 5-continued

|  | | | | Polymer data | | | | | |
|---|---|---|---|---|---|---|---|---|---|
| Example | Initial charge of ethylene (g) | Ethylene metered in (g/h) | Polymer yield (kg) | Metallocene activity [kg of PP/g of met. × h] | VN [cm$^3$/g] | Ethylene content (% by weight) | $M_w$ (g/mol) | $M_w/M_n$ | Tg (° C.) |
| 52 | 300 | 369 | 0.88 | 220 | 270 | 42.7 | 278500 | 2.8 | −43 |
| 53 | 300 | 300 | 1.55 | 388 | 415 | 46.1 | 461500 | 2.5 | −49 |
| 54 | 300 | 300 | 1.20 | 300 | 325 | 45.2 | 335500 | 2.4 | −49 |
| C55 | 300 | 300 | 1.40 | 350 | 169 | 44.5 | 197500 | 2.3 | −48 |

Reactor blends can also be prepared using the metallocenes of the invention. For this purpose, for exmple, a homopolymer is prepared in a first polymerization stage and a copolymer is prepared in a second stage.

This principle is illustrated by some examples.

EXAMPLE 56

A dry 150 dm$^3$ reactor was flushed with nitrogen and charged at 20° C. with 80 dm$^3$ of a dearomatized petroleum fraction having a boiling range from 100 to 120° C.

The gas space was then flushed free of nitrogen by pressurization with 2 bar of propylene and depressurization, carried out five times. After addition of 50 l of liquid propylene, 64 cm$^3$ of methylaluminoxane solution in toluene (corresponding to 100 mmol of Al, molar mass according to cryoscopic determination: 1080 g/mol) were added and the contents of the reactor were heated to 60° C. A hydrogen content of 2.0% was established in the gas space of the reactor by metering in hydrogen and this was later kept constant during the 1st polymerization stage by metering in further amounts.

8.0 mg of dimethylsilanediylbis(2-methyl-4-(3',5'-diisopropylphenyl)indenyl)zirconium dichloride were dissolved in 32 cm$^3$ of the methylaluminoxane solution in toluene (corresponding to 50 mmol of Al) and after 15 minutes introduced into the reactor. In a 1st polymerization stage, polymerization was now carried out for 5 hours at 60° C. The reactor was then vented to a pressure of 3 bar and 2000 g of ethylene gas were fed in. This increased the reactor pressure to 8 bar and polymerization was carried out at 50° C. for a further 14 hours before the reaction was stopped by means of CO$_2$ gas.

This gave 19.9 kg of block copolymer, corresponding to a metallocene activity of 131 kg of copolymer/g of metallocene×h.

VN=345 cm$^3$/g; MFI (230/5)=1.9 dg/min; MFI (230/2.16)=0.7 dg/min; melting point of the polymer from the 1st polymerization stage: 159° C.; glass transition temperature of the polymer from the 2nd polymerization stage: −46° C.; the block copolymer contained 7.8% by weight of ethylene; fractionation of the product gave the following composition: 79% by weight of homopolymer, 21% by weight of copolymer, with the copolymer having an ethylene content of 37.2% by weight. The mean C$_2$ block length in the copolymer was 1.9.

EXAMPLE 57

Example 56 was repeated, but the temperature in the 2nd polymerization stage was 60° C. instead of 50° C. and the polymerization time was only 10 hours instead of 14 hours.

This gave 20.8 kg of block copolymer, corresponding to a metallocene activity of 173 kg of copolymer/g of metallocene×h.

VN=305 cm$^3$/g; MFI (230/5)=5.3 dg/min; MFI (230/2.16)=2.0 dg/min; melting point of the polymer from the 1st polymerization stage=159° C.; glass transition temperature of the polymer from the 2nd polymerization stage: −50° C.; the block copolymer contained 8.4% by weight of ethylene; fractionation of the product gave the following composition: 68% by weight of homopolymer, 32% by weight of copolymer, with the copolymer having an ethylene content of 26.2% by weight. The mean C$_2$ block length in the copolymer was 2.0.

EXAMPLE 58

Example 57 was repeated, but using 3000 g of ethylene in place of 2000 g of ethylene in the 2nd polymerization stage.

This gave 21.5 kg of block copolymer, corresponding to a metallocene activity of 179 kg of copolymer/g of metallocene×h.

VN=285 cm$^3$/g; MFI (230/5)=5.6 dg/min; MFI (230/2.16)=2.1 dg/min; melting point of the polymer from the 1st polymerization stage: 160° C.; glass transition temperature of the polymer from the 2nd polymerization stage: −52° C.; the block copolymer contained 14.1% by weight of ethylene. Fractionation of the product gave the following composition:
72.5% by weight of homopolymer, 27.5% by weight of copolymer, with the copolymer having an ethylene content of 51.3% by weight.

EXAMPLE 59

Example 57 was repeated, but using 4000 g of ethylene in place of 2000 g of ethylene in the 2nd polymerization stage. This gave 22.0 kg of block copolymer, corresponding to a metallocene activity of 184 kg of copolymer/g of metallocene×h.

VN=292 cm$^3$/g; MFI (230/5)=5.3 dg/min; MFI (230/2.16)=2.3 dg/min; melting point of the polymer from the 1st polymerization stage: 160° C.; glass transition temperature of the polymer from the 2nd polymerization stage: −53° C.; the block copolymer contained 20.6% by weight of ethylene. Fractionation of the product gave the following composition:
66.5% by weight of homopolymer; 33.5% by weight of copolymer, with the copolymer having an ethylene content of 61.5% by weight.

COMPARATIVE EXPERIMENT FOR EXAMPLE 57

The procedure of Example 57 was repeated, but using dimethylsilanediylbis(2-methyl-4-phenyl-1-indenyl)zirconium dichloride as a metallocene not according to the invention. This gave 20.0 kg of block copolymer.

VN=225 cm³/g; MFI (230/5)=14 dg/min; MFI (230/2.16)=4.1 dg/min; melting point of the polymer from the 1st polymerization stage 159° C.; glass transition temperature of the polymer from the 2nd polymerization stage: −45° C.; the block copolymer contained 8.2% by weight of ethylene. Fractionation of the product gave the following composition:

70% by weight of homopolymer; 30% by weight of copolymer, with the copolymer having an ethylene content of 27.3% by weight. The mean $C_2$ block length in the copolymer was 2.5. The comparative experiment shows that the high molar mass of Example 57 cannot be achieved.

High molecular weight terpolymers can also be prepared using the metallocenes of the invention. The principle is illustrated by some examples:

EXAMPLES 60–64

The procedure of Example 45 was repeated, but in addition 100 g of a further monomer were initially placed in the reactor (type of monomer and polymerization results are shown in Table 6).

TABLE 6

| Example | Monomer | Metallocene activity [kg of PP/g of met. × h] | VN [cm³/g] | Content of comonomer (% by weight) | |
|---|---|---|---|---|---|
| | | | | Ethylene | further monomer |
| 60 | 1-Butene | 305 | 349 | 40.8 | 3.0 |
| 61 | 4-Methyl-1-pentene | 336 | 328 | 44.0 | 2.3 |
| 62 | 1-Hexene | 380 | 400 | 42.6 | 3.2 |
| 63 | Ethylidene-norbornene | 264 | 305 | 41.5 | 2.4 |
| 64 | 1,4-Hexadiene | 288 | 278 | 45.2 | 2.8 |

High molecular weight copolymers with olefins higher than ethylene can also be prepared using the metallocenes of the invention. The principle is illustrated by some examples:

EXAMPLES 65–69

The procedure of Example 6 was repeated, but the ethylene was replaced by the same amount by one of the olefins from Table 7 as comonomer. Results of the polymerizations are likewise shown in Table 7.

TABLE 7

| Example | Comonomer | Metallocene activity [kg of PP/g of met. × h] | VN [cm³/g] | Comonomer content [% by weight] |
|---|---|---|---|---|
| 65 | 1-Butene | 154.2 | 452 | 2.4 |
| 66 | 4-Methyl-1-pentene | 107.3 | 437 | 2.6 |
| 67 | 1-Hexene | 192.5 | 490 | 3.0 |
| 68 | 1-Octene | 124.5 | 417 | 2.2 |
| 69 | Ethylidene-norbornene | 139.5 | 329 | 1.7 |

We claim:

1. A copolymer comprising from 80 to 40% by weight of propylene units, based on the total copolymer, and from 20 to 60% by weight of at least one comonomer, based on the total copolymer, which copolymer has been obtained by a polymerization of the propylene units and the at least one comonomer in the presence of a metallocene catalyst, wherein the copolymer has a viscosity number of greater than 250 cm³/g, and the at least one comonomer comprises units prepared from ethylene or at least one olefin having at least 4 carbon atoms and the formula $R^a$—CH=CH—$R^b$, where $R^a$ and $R^b$ are identical or different and are each a hydrogen atom or an alkyl group having from 1 to 15 carbon atoms, or $R^a$ and $R^b$ together with the carbon atoms connecting them form a ring having from 4 to 12 carbon atoms.

2. The copolymer as claimed in claim 1, wherein the metallocene catalyst comprises at least one mettallocene compound having the formula (I):

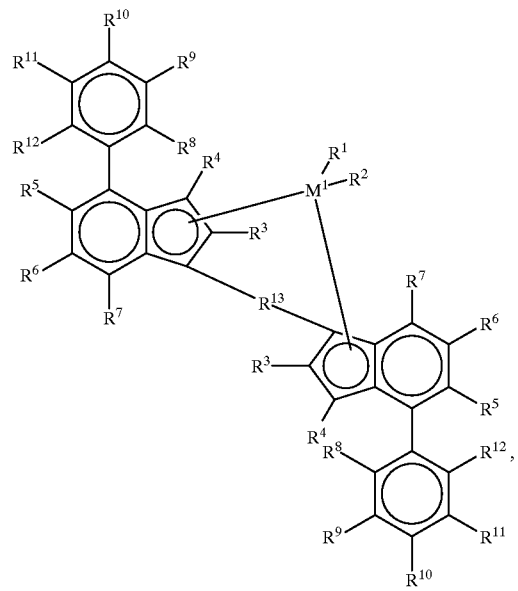

(I)

where $M^1$ is a metal of group IVb, Vb or VIb of the Periodic Table, $R^1$ and $R^2$ are identical or different and are each a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group, an OH group or a halogen atom, the radicals $R^3$ are identical or different and are each a halogen atom, a $C_1$-$C_{20}$-hydrocarbon group a $C_1$-$C_{10}$-alkenyl group, a $C_6$-$C_{10}$-aryl group or a $NR^{16}_2$—, —$SR^{16}$, —$OSiR^{16}_3$, —$SiR^{16}_3$ or $PR^{16}_2$ radical, where $R^{16}$ is a halogen atom, a $C_1$-$C_{10}$-alkyl group or a $C_6$-$C_{10}$-aryl group, $R^4$ to $R^{12}$ are identical or different and are as defined for $R^3$ or two or more adjacent radicals $R^4$ to $R^{12}$ together with the atoms connecting them form one or more aromatic or aliphatic rings, or the radicals $R^5$ and $R^8$ or $R^{12}$ together with the atoms connecting them form an aromatic or aliphatic ring, $R^4$ to $R^{12}$ are optionally hydrogen and one or more radicals $R^8$, $R^9$, $R^{10}$, $R^{11}$ or $R^{12}$ are different from hydrogen when the radicals $R^5$, $R^6$ and $R^7$ are hydrogen, $R^{13}$

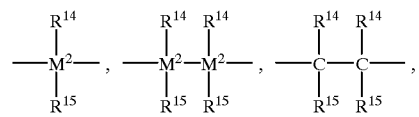

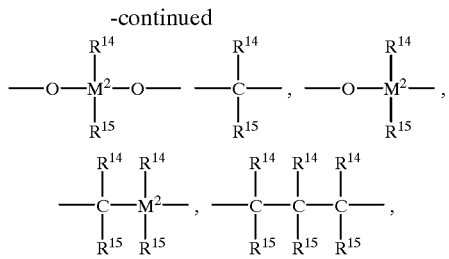

$=BR^{14}$, $=AlR^{14}$, —Ge—, —O—, —S—, $=SO$, $=SO_2$, $=NR^{14}$, $=CO$, —PR$^{14}$ or $=P(O)R^{14}$, where $R^{14}$ and $R^{15}$ are identical or different and are each a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group a $C_2$–$C_{10}$-alkenyl group, a $C_7$–$C_{40}$-arylalkyl group, a $C_8$–$C_{40}$-arylalkenyl group, a $C_7$–$C_{40}$-alkylaryl group or $R^{14}$ and $R^{15}$ together with the atoms connecting them form a ring and $M^2$ is silicon, germanium or tin.

3. A terpolymer comprising the copolymer as claimed in claim 2, and up to 10% by weight of an α-olefin or a diene, based on the total terpolymer.

4. The copolymer as claimed in claim 2, wherein the at least one comonomer is ethylene, 1-butene, 1-pentene, 1-hexene, 4-methyl-1-pentene or ethylidenenorbornene.

5. The copolymer as claimed in claim 2, wherein the viscosity number is greater than 300 cm$^3$/g.

6. The terpolymer as claimed in claim 3, wherein the α-olefin or the diene is 1-butene, 4-methyl-1-pentene, 1-hexene, ethylidenenorbornene, norbornadiene, dicyclopentadiene, 1,4-hexadiene or butadiene.

7. The copolymer as claimed in claim 2, wherein the metallocene catalyst further comprises at least one cocatalyst.

8. The copolymer as claimed in claim 7, wherein the at least one cocatalyst comprises at least one aluminoxane.

9. The copolymer as claimed in claim 7, wherein a support for at least one of the components of the metallocene catalyst is present.

10. The copolymer of claim 7, wherein the at least one cocatalyst comprises at least one compound of the formulas $R^{18}_x NH_{4-x} BR^{19}_4$, $R^{18}_x PH_{4-x} BR^{19}_4$ and $R^{18}_3 CBR^{19}_4 BR^{19}_3$, where x is a number from 1 to 4, the groups $R^{18}$ are identical or different, and are $C_1$–$C_{10}$-alkyl groups or $C_6$–$C_{18}$-aryl groups, or two groups $R^{18}$ together with the atoms connecting them form a ring, and the groups $R^{19}$ are identical or different, and are $C_6$–$C_{18}$-aryl groups, optionally substituted by an alkyl group, a haloalkyl group or a fluorine atom.

11. The copolymer as claimed in claim 2, wherein a prepolymerization was carried out before the polymerization.

12. The copolymer as claimed in claim 2, wherein radicals $R^4$ to $R^{12}$ are identical or different and are hydrogen or are as defined for the radical $R^3$ and at least one of radicals $R^3$, $R^8$, $R^9$, $R^{10}$, $R^{11}$ or $R^{12}$ is different from hydrogen.

13. The terpolymer as claimed in claim 3, wherein the α-olefin or the diene has the formula $R^a$—CH=CH—$R^b$, where $R^a$ and $R^b$ are identical or different and are each an alkyl group having from 1 to 15 carbon atoms or an alkenyl group having from 2 to 12 carbon atoms, or $R^a$ and $R^b$ together with the carbon atoms connecting them form a saturated or unsaturated ring having from 4 to 12 carbon atoms.

14. A process for preparing the copolymer as claimed in claim 7, comprising polymerizing the propylene units and the at least one comonomer in the presence of the metallocone catalyst at a temperature of from 50 to 200° C. and a pressure of from 0.5 to 100 bar.

15. The process as claimed in claim 14, wherein the at least one metallocene compound is used in a concentration, based on the transition metal, of from $10^{-3}$ to $10^{-8}$ mol of transition metal per dm$^3$ of reactor volume and the at least one cocatalyst is used in a concentration of from $10^{-5}$ to $10^{-1}$ mol per dm$^3$ of reactor volume.

16. A copolymer comprising from 98.5 to 85% by weight of propylene units, based on the total copolymer, and from 1.5 to 15% by weight of at least one comonomer, based on the total copolymer, which copolymer has been obtained by a polymerization of the propylene units and the at least one comonomer in the presence of a metallocene catalyst, wherein the copolymer has a viscosity number of greater than 200 cm$^3$/g, and the at least one comonomer comprises units prepared from ethylene or at least one olefin having at least 4 carbon atoms and the formula $R^a$—CH=CH—$R^b$, where $R^a$ and $R^b$ are identical or different and are each a hydrogen atom or an alkyl group having from 1 to 15 carbon atoms, or $R^a$ and $R^b$ together with the carbon atoms connecting them form a ring having from 4 to 12 carbon atoms.

17. The copolymer as claimed in claim 16, wherein the viscosity number is greater than 250 cm$^3$/g.

18. The copolymer as claimed in claim 16, wherein the at least one comonomer is ethylene, 1-butene, 1-pentene, 1-hexene, 4-methyl-1-pentene or 1-octene.

19. The copolymer as claimed in claim 16, wherein the metallocene catalyst comprises at least one metallocene compound having the formula (I):

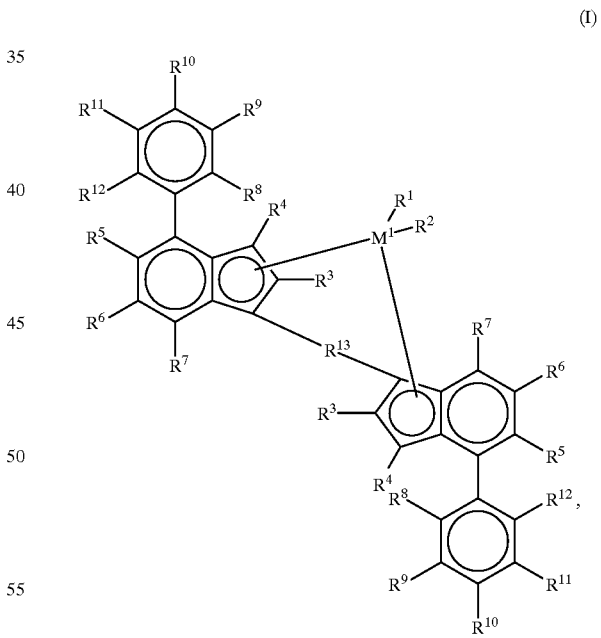

where $M^1$ is a metal of group IVb, Vb or VIb of the Periodic Table, $R^1$ and $R^2$ are identical or different and are each a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, an OH group or a halogen atom, the radicals $R^3$ are identical or different and are each a halogen atom, a $C_1$–$C_{20}$-hydrocarbon group a $C_1$–$C_{10}$-alkenyl group, a $C_6$–$C_{10}$-aryl group or a $NR^{16}_2$—, —$SR^{16}$, —$OSiR^{16}_3$, —$SiR^{16}_3$ or $PR^{16}_2$ radical, where $R^{16}$ is a halogen atom, a $C_1$–$C_{10}$-alkyl group or a $C_6$–$C_{10}$-aryl group, $R^4$ to $R^{12}$ are identical or different and are as defined for $R^3$ or two or more adjacent radicals $R^4$ to $R^{12}$ together with the atoms connecting them form one or more aromatic or aliphatic rings, or the radicals $R^5$ and $R^8$ or $R^{12}$ together with the atoms connecting them form an aromatic or aliphatic ring, $R^4$ to $R^{12}$ are optionally hydrogen and one or more radicals $R^8$, $R^9$, $R^{10}$, $R^{11}$ or $R^{12}$ are different from hydrogen when the radicals $R^5$, $R^6$ and $R^7$ are hydrogen, $R^{13}$

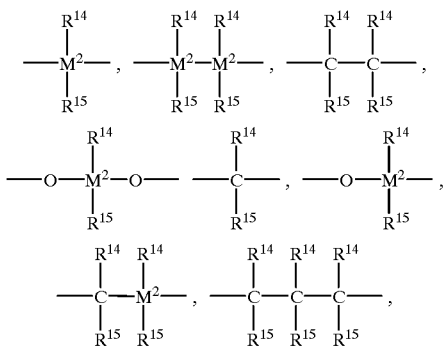

=$BR^{14}$, =$AlR^{14}$, —Ge—, —O—, —S—, =SO, =$SO_2$, =$NR^{14}$, =CO, =$PR^{14}$ or =$P(O)R^{14}$, where $R^{14}$ and $R^{15}$ are identical or different and are each a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$-$C_{10}$-alkoxy group a $C_2$–$C_{10}$--alkenyl group, a $C_7$–$C_{40}$-arylalkyl group, a $C_8$–$C_{40}$-arylalkenyl group, a $C_7$–$C_{40}$-alkylaryl group or $R^{14}$ and $R^{15}$ together with the atoms connecting them form a ring and $M^2$ is silicon, germanium or tin.

20. The copolymer as claimed in claim 19, wherein the metallocene catalyst further comprises at least one cocatalyst.

21. The copolymer as claimed in claim 20, wherein the at least one cocatalyst comprises at least one aluminoxane.

22. The copolymer of claim 20, wherein the at least one cocatalyst comprises at least one compound of the formulas $R^{18}_x NH_{4-x} BR^{19}_4$, $R^{18}_x PH_{4-x} BR^{19}_4$ and $R^{18}_3 CBR^{19}_4 BR^{19}_3$, where x is a number from 1 to 4, the groups $R^{18}$ are identical or different, and are $C_1$–$C_{10}$-alkyl groups or $C_6$–$C_{18}$-aryl groups, or two groups $R^{18}$ together with the atoms connecting them form a ring, and the groups $R^{19}$ are identical or different, and are $C_6$–$C_{18}$-aryl groups, optionally substituted by an alkyl group, a haloalkyl group or a fluorine atom.

23. The copolymer as claimed in claim 20, wherein a support for at least one of the components of the metallocene catalyst is present.

24. The copolymer as claimed in claim 19, wherein a prepolymerization was carried out before the polymerization.

25. The copolymer as claimed in claim 19, wherein radicals $R^4$ to $R^{12}$ are identical or different and are hydrogen or are as defined for the radical $R^3$ and at least one of radicals $R^8$, $R^9$, $R^{10}$, $R^{11}$ or $R^{12}$ is different from hydrogen.

26. The copolymer as claimed in claim 19, wherein the viscosity number is greater than 250 cm³/g.

27. The copolymer as claimed in claim 26, wherein the viscosity number is greater than 300 cm³/g.

* * * * *